United States Patent
Wu et al.

(10) Patent No.: US 11,263,395 B1
(45) Date of Patent: Mar. 1, 2022

(54) SYSTEM AND METHOD FOR DOCUMENT TRANSFORMATION AND COMPLIANCE

(71) Applicant: SIDE, INC., San Francisco, CA (US)

(72) Inventors: Edward Wu, San Mateo, CA (US); Guy Gal, San Francisco, CA (US); Hilary Saunders, El Granada, CA (US); Stephen Saunders, El Granada, CA (US); Christopher Dzoba, San Francisco, CA (US); Prescott Prue, San Fancisco, CA (US); Zachary Karrasch, San Francisco, CA (US); Jeffrey Judkins, Richmond, CA (US); Elizabeth Paris, San Francisco, CA (US); Adriano Castro, San Francisco, CA (US); Mark J. Stefik, Portola Valley, CA (US)

(73) Assignee: Side, Inc., San Francisco, CA (US)

( * ) Notice: Subject to any disclaimer, the term of this patent is extended or adjusted under 35 U.S.C. 154(b) by 0 days.

(21) Appl. No.: 16/560,964

(22) Filed: Sep. 4, 2019

Related U.S. Application Data

(60) Provisional application No. 62/728,051, filed on Sep. 6, 2018.

(51) Int. Cl.
| | |
|---|---|
| G06F 17/00 | (2019.01) |
| G06F 40/186 | (2020.01) |
| G06Q 50/16 | (2012.01) |
| G06K 9/00 | (2022.01) |
| G06F 40/174 | (2020.01) |

(52) U.S. Cl.
CPC .......... *G06F 40/186* (2020.01); *G06F 40/174* (2020.01); *G06K 9/00483* (2013.01); *G06Q 50/167* (2013.01)

(58) Field of Classification Search
None
See application file for complete search history.

(56) References Cited

U.S. PATENT DOCUMENTS

| | | | |
|---|---|---|---|
| 6,240,429 B1 | 5/2001 | Thornton et al. | |
| 6,321,202 B1 | 11/2001 | Raveis, Jr. | |
| 6,658,624 B1 | 12/2003 | Savitzky et al. | |
| 6,684,196 B1 | 1/2004 | Mini et al. | |

(Continued)

FOREIGN PATENT DOCUMENTS

WO WO-2006020801 A2 * 2/2006 ............. G06Q 40/02

*Primary Examiner* — Mustafa A Amin
(74) *Attorney, Agent, or Firm* — Krista A. Wittman

(57) ABSTRACT

A system and method for document transformation and compliance are provided. Document templates are maintained and each template includes data fields each associated with a data field identifier. Data values are received in one or more of the data fields of at least one document template. The data values are associated with the data fields into which the data values are received via the data field identifiers for those data fields. A property address is received and a set of compliance rules is identified. A subset of the document templates are retrieved as active documents for a transaction of the property based on the identified rules. The active documents are populated with those data fields that are associated with the linked data values via the data field identifiers. Compliance checking of the populated data values in the active documents is performed using a compliance rule set.

24 Claims, 15 Drawing Sheets

(56) References Cited

U.S. PATENT DOCUMENTS

| | | | |
|---|---|---|---|
| 7,124,354 B1 | 10/2006 | Ramani et al. | |
| 7,568,104 B2 | 7/2009 | Berryman et al. | |
| 7,640,204 B2 | 12/2009 | Florance et al. | |
| 7,801,739 B2 | 9/2010 | Smith | |
| 7,725,359 B1 | 10/2010 | Katzfey et al. | |
| 7,818,219 B2 | 10/2010 | Klivington et al. | |
| 8,046,389 B2 | 10/2011 | Ritter | |
| 8,095,427 B1* | 1/2012 | Buxton | G06Q 30/0609 |
| | | | 705/26.25 |
| 8,200,713 B2 | 6/2012 | Cacenco et al. | |
| 8,417,625 B2 | 4/2013 | Bannerjee et al. | |
| 8,423,469 B2 | 4/2013 | Marlow et al. | |
| 8,433,650 B1 | 4/2013 | Thomas | |
| 8,442,906 B1 | 5/2013 | Thomas | |
| 8,880,538 B1 | 11/2014 | Petersson | |
| 9,330,375 B2* | 5/2016 | Allison | G06F 40/166 |
| 9,672,524 B2 | 6/2017 | Papa et al. | |
| 10,002,398 B1 | 6/2018 | Isaacson | |
| 10,109,027 B1 | 10/2018 | Stack | |
| 10,552,525 B1 | 2/2020 | Allison et al. | |
| 10,832,357 B1 | 11/2020 | Pagliano | |
| 10,943,294 B1 | 3/2021 | Tarmann et al. | |
| 2001/0047282 A1 | 11/2001 | Raveis | |
| 2003/0074248 A1 | 4/2003 | Braud et al. | |
| 2003/0187756 A1 | 10/2003 | Klivington et al. | |
| 2003/0233316 A1* | 12/2003 | Hu | G06Q 10/10 |
| | | | 705/38 |
| 2004/0083164 A1 | 4/2004 | Schwartz et al. | |
| 2004/0267595 A1 | 12/2004 | Woodings et al. | |
| 2006/0085330 A1 | 4/2006 | Imrey et al. | |
| 2006/0235715 A1 | 10/2006 | Abrams et al. | |
| 2007/0089053 A1 | 4/2007 | Uhlig et al. | |
| 2007/0121850 A1 | 5/2007 | Klos et al. | |
| 2007/0244798 A1 | 10/2007 | Weidenbenner | |
| 2008/0091700 A1 | 4/2008 | Brotherson et al. | |
| 2008/0091954 A1 | 4/2008 | Morris et al. | |
| 2008/0133572 A1 | 6/2008 | Verhey-Henke | |
| 2009/0048938 A1 | 2/2009 | Dupray | |
| 2009/0319927 A1* | 12/2009 | Beeman | G06F 40/166 |
| | | | 715/764 |
| 2010/0100522 A1 | 4/2010 | Allison et al. | |
| 2010/0145902 A1 | 6/2010 | Boyan et al. | |
| 2010/0293108 A1 | 11/2010 | Gurvitch et al. | |
| 2011/0270766 A1 | 11/2011 | Ramakrishnan et al. | |
| 2011/0276395 A1 | 11/2011 | Gaton et al. | |
| 2011/0289010 A1 | 11/2011 | Rankin et al. | |
| 2011/0289106 A1 | 11/2011 | Rankin et al. | |
| 2012/0231814 A1 | 9/2012 | Calman et al. | |
| 2012/0246084 A1 | 9/2012 | Marshall | |
| 2013/0144683 A1 | 6/2013 | Rappaport et al. | |
| 2013/0262290 A1* | 10/2013 | Hanson | H04W 4/029 |
| | | | 705/38 |
| 2013/0290195 A1* | 10/2013 | Frazier | G06Q 30/0278 |
| | | | 705/306 |
| 2013/0318426 A1 | 11/2013 | Shu et al. | |
| 2013/0339189 A1 | 12/2013 | Minerick | |
| 2014/0019318 A1 | 1/2014 | Haberaecker et al. | |
| 2014/0164255 A1 | 6/2014 | Daly et al. | |
| 2014/0279573 A1 | 9/2014 | Coats et al. | |
| 2014/0337189 A1* | 11/2014 | Barsade | G06Q 40/123 |
| | | | 705/31 |
| 2015/0052080 A1 | 2/2015 | Letzeiser | |
| 2015/0081497 A1 | 3/2015 | Patel et al. | |
| 2015/0178252 A1 | 6/2015 | Dunn et al. | |
| 2015/0261795 A1 | 9/2015 | Medeiros et al. | |
| 2015/0317295 A1 | 11/2015 | Sherry et al. | |
| 2016/0071178 A1 | 3/2016 | Perriello et al. | |
| 2016/0110825 A1 | 4/2016 | Heine, III | |
| 2016/0292262 A1 | 10/2016 | Matsumoto | |
| 2017/0010680 A1 | 1/2017 | Bryant | |
| 2017/0076408 A1 | 3/2017 | D'Souza et al. | |
| 2017/0286389 A1* | 10/2017 | Ceneviva | G06F 40/174 |
| 2018/0005186 A1 | 1/2018 | Hunn | |
| 2018/0053265 A1 | 2/2018 | Lyon | |
| 2018/0096362 A1 | 4/2018 | Kwan | |
| 2018/0117446 A1 | 5/2018 | Tran et al. | |
| 2018/0143975 A1 | 5/2018 | Casal et al. | |
| 2018/0167198 A1 | 6/2018 | Muller et al. | |
| 2018/0239959 A1 | 8/2018 | Bui et al. | |
| 2018/0264347 A1 | 9/2018 | Tran et al. | |
| 2018/0293648 A1* | 10/2018 | George | G06K 9/00449 |
| 2018/0365201 A1 | 12/2018 | Hunn et al. | |
| 2019/0073729 A1 | 3/2019 | Cheng-Shorland et al. | |
| 2019/0236733 A1 | 8/2019 | Fenn | |
| 2019/0266683 A1 | 8/2019 | Burns | |
| 2019/0361917 A1 | 11/2019 | Tran et al. | |
| 2019/0385240 A1 | 12/2019 | Lee et al. | |
| 2020/0034940 A1 | 1/2020 | Parikh et al. | |

* cited by examiner

Fig. 4.

Form Elements   [Add Form Elements] ~134

| Headers 131 ID | 132 Name | 133 Actions |
|---|---|---|
| 135 — -Kjjb610zxa9OSSTB0Jn | Property Access Information | ✎ |
| -Kjjej1XPMPMxREHUjQA | Additional Information | ✎ |
| -Kjo0VNib_Cf-le3Igck | Scheduling Information | ✎ |
| -KjobB7rgxSkPg_IdXR3 | Roof Inspection Information | ✎ |
| -KjokX87utyXX1MqcMee | Sewer Lateral Inspection Information | ✎ |
| -Kjop1WCMgL7iULINaIG | Termite Inspection Information | ✎ |
| -Kjou-KStD4Br94eBGrM | Sign Post Installer Information | ✎ |
| -KjoyiIGdGmUvXMJzS7X | Property Overview | ✎ |
| KjoynfjmiYQGdYJrVLP | Community | ✎ |
| -KjoytNzbBYYO0PevqL4 | Schools | ✎ |

130 — Mark Stevens

Fig. 7(Con'd).

| | |
|---|---|
| ✦ 1120 Rose Avenue | ◯ Mark Stevens ▽ |

101 {
- Cover Sheet ⊙
- Documents
- Listing Services
- Marketing Services

102

Cover Sheet

Listing Agent ← 103

Select Agent
Mark Stevens ▼

Seller(s) information ← 104

Adam Able
Adam.Able@gmail.com
(408) 365-1234
1120 Rose Avenue
Mountain View, CA
94040

EDIT    ADD SELLER 2

Important Dates ← 105

Contract Date *
Friday, December 8th 2017

On Market Date*
Friday, December 22nd 2017

Property Information ← 106

Property Being Sold

APN Number
189-23-023

Street*
1120 Rose Avenue
_____ SAME AS ABOVE

Apt/Unit/Suite Number

| City* | State* | Zip Code* |
|---|---|---|
| Mountain View | CA | 94040 |

Document Templates

| Template Name | Revision Date | Appears in Listings? | Appears in Offers? | Last Published on | Last Edited on | Local Type | Assigned Locals |
|---|---|---|---|---|---|---|---|
| 1031 Exchange BES Buyer | 11/2009 | | Offers | Nov 21 2017 3:35 pm | | states | CA |
| 1031 Exchange SES Seller | 11/2009 | Listings | | Nov 21 2017 3:36 pm | | states | CA |
| 1031 QA Copy | 11/2009 | Listings | | Dec 4 2017 3:01 pm | | | Global |
| 48 Hour Notice Of Inspection Prior to Termination of Tenancy FEHN | 4/2011 | Listings | Offers | Sep 15 2017 1:34 pm | | states | CA |
| Add Info Regarding Termination of Tenancy within One year After Foreclosure CAR | 11/2012 | Listings | Offers | | Oct 17 2017 4:26 pm | states | CA |
| Addendum Buyer | 12/2015 | | Offers | Nov 21 2017 3:44 pm | | states | CA |

ADD DOCUMENT TEMPLATES

Mark Stevens

Fig. 14.

Residential Listing Agreement

RESIDENTIAL LISTING AGREEMENT
(Exclusive Authorization and right to sell)

Date Prepared: 12/08/2017

Adam Able ("Seller"),
Reside Real Estate ("Broker")

1. EXCLUSIVE RIGHT TO SELL: hereby employs and grants beginning (date) _____ and ending at 11:59 P.M. on (date) _____ ("Listing Period") the exclusive and irrevocable right to sell or exchange the real property described as
1120 Rose Avenue _____, situated in _____ (City),
Santa Clara (County), California, 94040 (Zip Code), Assessor's Parcel No. 189-23-023 ("Property").
☐ This Property is a manufactured (mobile) home. See addendum for additional terms.
☐ This Property is being sold as part of a probate, conservatorship or guardianship. See addendum for additional terms.

2. LISTING PRICE AND TERMS:
A. The listing price shall be: Nine Hundred Fifty Thousand Nine Hundred Dollars ($ 950,900 ← 192
B. Listing Terms: _____

3. COMPENSATION TO BROKER:
Notice: The amount or rate of real estate commission is not fixed by law. They are set by each Broker individually and may be negotiable between Seller and Broker (real estate commissions include all compensation and fees to Broker).
A. Seller agrees to pay to broker as compensation for services irrespective of agency relationship(s), either ☐
☐ 5 percent of the listing price (or if a purchase agreement is entered into, of the purchase price), or ☐
$ _____ AND _____, as follows:
(1) If during the Listing Period, or any extension, Broker, cooperating broker, Seller or any other person procures a ready, willing, and able buyer(s) whose offer to purchase the Property on any price and terms is accepted by Seller, provided the Buyer completes the transaction or is prevented from doing so by Seller.

190 (form)
191 (arrow)

SYSTEM AND METHOD FOR DOCUMENT TRANSFORMATION AND COMPLIANCE

CROSS-REFERENCE TO RELATED APPLICATIONS

This non-provisional patent application claims priority under 35 U.S.C. § 119(e) to U.S. Provisional Patent application, Ser. No. 62/728,051, filed Sep. 6, 2018, the disclosure of which is incorporated by reference.

FIELD

This application relates in general to identifying and populating documents, and in particular to a system and method for document grouping and transformation.

BACKGROUND

Real estate purchases and sales are the largest financial transactions and investments for many people, especially with the increasing cost of real estate. Due to the cost and time required for a real estate transaction, many individuals are infrequently involved in such transactions and may not be familiar with regulations governing the transactions and issues that can arise. Additionally, real estate transactions are complex and involve many details and issues. Accordingly, many purchasers and buyers choose to hire a knowledgeable advocate to assist with the transaction, including a real estate agent or broker. Real estate agents and brokers can provide a party to such transaction with useful information, including options and risks regarding the transaction. Further, agents and brokers have legal and financial responsibilities to ensure that a transaction is successfully performed and that the transaction complies with all applicable guidelines and regulations.

Over the years, the amount of documentation involved in supporting real estate transactions and financing of such transactions has grown. The required documents have become increasingly numerous and complex, and assuring compliance has become more difficult. The documentation requirements generally differ from one community to another, so agents and brokers must pay attention to the differences in local regulations. They must also keep up with changes in the regulations for all of the relevant governing bodies for every transaction. Also, governing bodies are overlapping and any transaction occurring within the jurisdiction of both governing bodies, must comply with the regulations of the governing bodies. For example, there are often separate regulations for a neighborhood, city, county and state in which a piece of property is located.

Ensuring compliance with all guidelines and regulations can be time consuming and difficult. However, failure to comply with the regulations can potentially invalidate real estate transactions and can expose real estate brokers and agents to litigation and possible liability for failed transactions.

Currently, most real estate transactions are preformed manually, requiring an individual, such as an agent or broker, to identify, collect, and populate documents required to complete a real estate transaction. The agent or broker must also ensure that the documents contain any updates and are correctly populated. Such manual tasks can be time consuming due to a number of documents required and the different requirements established by differing regulations between governing bodies. Additionally, the manual process for real estate transactions is prone to several sources of compliance errors as real estate agents and brokers prepare document packages for real estate transactions. Such errors and other failures to comply with the required regulations can invalidate a transaction and can expose agents and brokers to costly litigation, as well as stain a reputation of the agent or broker. Challenges associated the manual process for real estate transactions that make manual compliance difficult and error prone include large numbers of documents, different regulations and rules for different locations, and new information that becomes available during the transaction, which must be identified and included in the documents.

However, automation of real estate transactions has been attempted. For example, U.S. Pat. No. 9,330,375 covers loading virtual forms with selected properties. The virtual forms are electronic documents designed to have the appearance of standard real estate contract forms and act as placeholder documents into which data from a warehouse is inserted. However, such data insertion fails to include checking of the data to ensure compliance, correctness, completeness, and consistency of the data being inserted.

U.S. Pat. No. 8,423,469 covers a simplified loan process for a real estate transaction that is provided for the buyer based on unified communication between the buyer, relator, and mortgage originator and fails to cover transforming document to ensure complete, correct, consistent, and compliant data population.

U.S. Pat. No. 8,442,906 covers automating the performance and processing of tasks associated with a home sale or mortgage origination by making available pricing information matching real estate pricing criteria and generated loan information to a buyer. However, such automation of task processing fails to consider methods for ensuring data associated with the home sale or mortgage origination is complete, correct, consistent, and compliant.

U.S. Pat. No. 7,640,204 covers a digital marketplace in which real estate members can interact and facilitate transactions by exchanging accurate and standardized information. The marketplace can include survey and transaction tools, as well as tour scheduling. Thus, the marketplace fails to include document transformation via population and data checking.

U.S. Pat. No. 6,684,196 covers facilitating real property transactions between a buyer and seller by providing real estate services to facilitate a negotiation related to the transaction, rather than populating documents and checking for data completeness, consistency, correctness, and compliance.

U.S. Pat. No. 6,321,202 covers managing real estate transactions, including accessing vendor data based upon a phase of a real estate transaction and providing the vendor data to a contact upon the occurrence of the real estate transaction phase. Thus, the communication of data focuses on building relationships in real estate transactions, rather than document transformation based on a set of rules and checking data of the documents.

Further, U.S. Pat. No. 9,672,524 covers managing data related to a corporate entity to enhance retrieval of the documents database using tags. However, the retrieval enhancement fails to consider or include data population and checking.

Therefore, a need remains for improving processing of a computer to be able to automatically transform documents by changing a form of the documents based on received data, and identify errors and ensure compliance of data between different documents by checking for document completeness, consistency, correctness, and confirmation of data populating the documents.

SUMMARY

Real estate transactions can be extremely complex and generally require many documents for review and execution to formalize the transaction. Currently, such transactions are performed manually via a real estate agent or broker that fills out each document. However, manual processing of the documents often results in inconsistencies of data across the documents, incorrect data values based on a failure to identify and enter updated values, data values that are not compliance with local regulations, and other errors. Ensuring the correctness of the documents is extremely important because errors in the documents may invalidate the associated real estate transaction. Representations of documents that enable both human usability and automation by allowing data entry and automated checking of the data helps ensure data completeness, consistency, compliance, and correctness of the documents.

An embodiment provides a system and method for document transformation and compliance. Document templates relating to real estate are maintained and each template includes a plurality of data fields each associated with a data field identifier. The data field identifiers for the same data fields in different documents are the same. Data values are received in one or more of the data fields of at least one document template. The data values are linked to the data fields into which the data values are received via the data field identifiers for those data fields. A property address is received and a subset of the document templates are retrieved as active documents for a transaction of the property based on the received property address. The active documents are populated with those data fields that are associated with the linked data values via the data field identifiers. A set of compliance rules is determined based on the property address and compliance checking of the populated data values in the active documents is performed using the compliance rule set.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screenshot showing, by way of example, an interactive form for form element identifiers.

FIG. 10 is a diagram showing, by way of example, a document template library.

FIG. 14 is a diagram of a document template with data fields for property price.

DETAILED DESCRIPTION

Glossary

Figure 1:
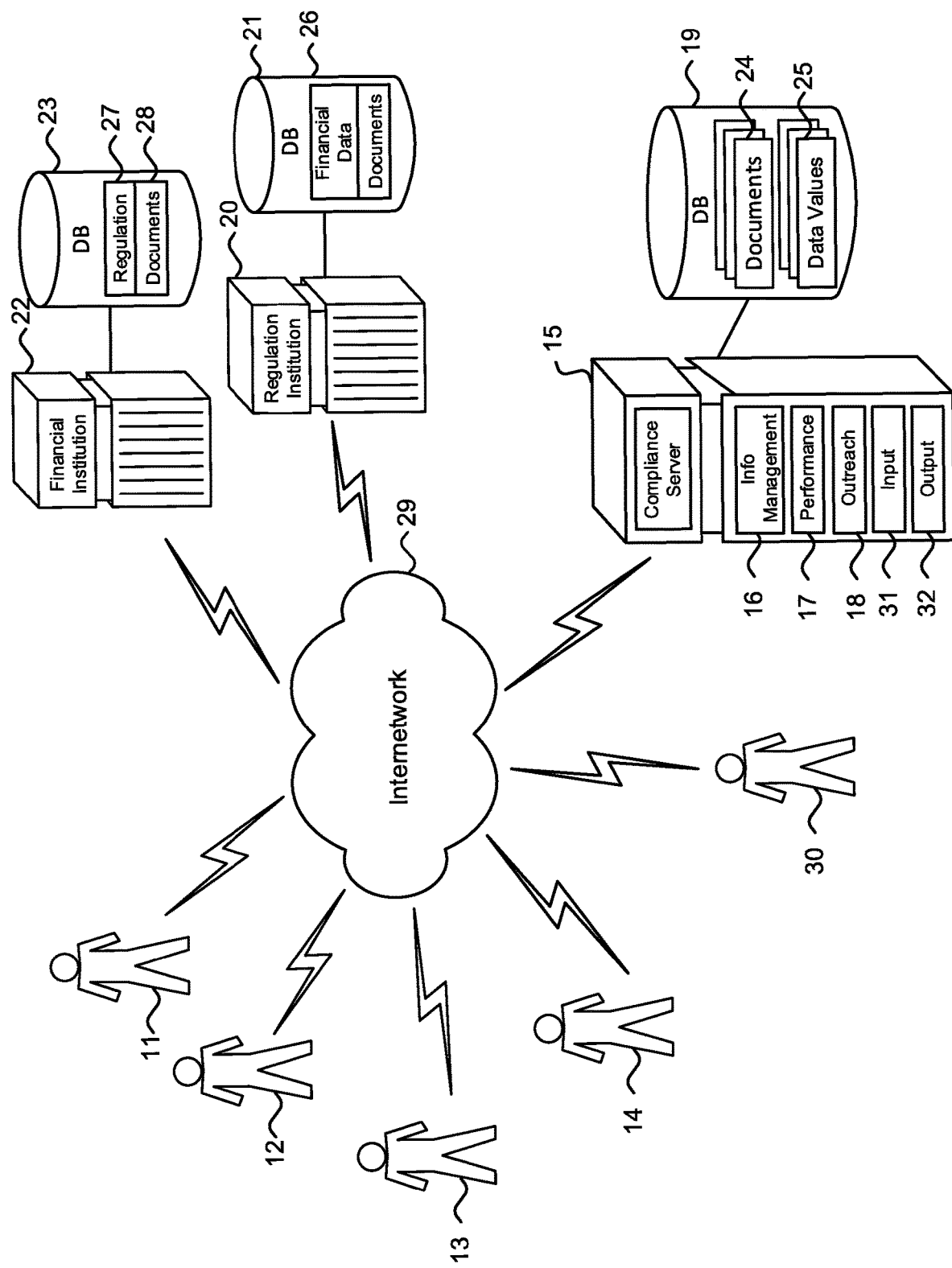
FIG. 1 is a block diagram showing a system for document grouping and transformation, in accordance with one embodiment.

Document package—a document package refers to a collection of documents prepared for, signed, and executed by parties of a real estate transaction. The package can include documents for listings or offers, including documents about real estate services performed in support of transactions, such as proofs of availability of funds, contracts with real estate agents and brokers, disclosures, inspection reports, and marketing agreements, as well as other types of documents. Different subsets of a document package may be provided to different parties of a transaction. For example, different documents are typically provided for buyers and sellers.

Completeness—testing a document package for completeness refers to automated testing to ensure that all of the required documents are included in the package and that all required fields in the documents are filled out. When specific information is provided as a value for a field, a trigger can add additional fields to the document beyond the initial fields displayed. Additionally, received data may also trigger one or more additional documents to be added to the document package.

Consistency—testing documents for consistency refers to automated testing to ensure that values of related fields in the documents are filled out in a semantically-consistent way. For example, every "initials" field for the same person should contain the same initials. Additionally, fields that have different representations for the same information (e.g. "one thousand dollars" versus $1,000.00) should have the same or compatible meanings. All related fields should convey consistent meanings.

Correctness—testing documents for correctness refers to automated verification that data values and combinations of related fields have been verified by one or more authoritative sources. For examples, entries specified for street address, City, County, State, and Zip Code correspond to a correct combination recorded by an authoritative entity. The specified street address is within the specified city, the specified city is within the specified county, the specified county is within the specified state, and the zip code corresponds properly to the combination, and the property exists. Another example is that information about a "parcel number" for a property paired with an address corresponds to county land records. Another example is a bank statement vouching for the availability of funds. There can be different requirements on what it means for a source to be "authoritative," including having a well-known identity, using secure and digitally-signed communications, meeting government-approved requirements, backing by financial guarantees, and meeting certification requirements of legal, real estate, and banking institutions.

Compliance—testing documents for compliance refers to automated testing to ensure that the data values provided in the documents and the transactions proposed comply with all legal requirements. For a successful property transaction, no required documents can be omitted and the document versions must meet current requirements. In real estate transactions, there are often multiple governing organizations, including federal, state, county, city, and sometimes local organizations such as property owner associations. State and federal laws require that purchasers of property be informed of certain conditions of the property for consumer protection. Further, governing organizations may require disclosure of the nature, limitations, and conflicts regarding the responsibilities of the real estate agents. Compliance requires that the document package be complete, consistent, and correct.

Confirmation—brokers and agents are obligated to inform their clients about important information in the transactions. Common practice for compliance for avoiding potential legal liability is to provide explicit places in the documents for dated confirmation signatures on documents and for particular data fields. The steps involved include assuring that the documents include proper places for signatures or initials and dates in the documents presented to clients and others and also checking that a document package is thoroughly checked that all required signatures or initials are properly filled out and dated by clients.

Active documents—refer to programmatically-supported information that can be presented in a human-readable and legally appropriate form ("documents") in a computational medium, with a computational substrate ("active document) that enables people to fill in or select information and to interact with it, that efficiently supports information processing of the information such as checking it for completeness, consistency, correctness, compliance and confirmation. In this way, active documents support understanding and processing of information by people and active computational agents intended to assure that a real estate transaction is compliant with requirements.

Transaction identifier—a string of numbers and/or letters that uniquely identify a specific transaction of property.

Form element—corresponds to a region on a form that takes a value from a data field.

Form element identifier—a string of numbers and/or letters that are unique to a particular form element in a document.

Form element name—a human-readable name used to describe and identify a particular form element in a document.

Data field—location for storage of data, such as in a database.

Data field definition—human-readable information describing an associated data field in the database to which the data field definition is assigned and can include data field identifiers.

Data field identifier—a string of numbers and/or letters that uniquely identify a specific data field in the database.

Data field values—data values that populate a data field.

Bureau of Real Estate (BRE)—is a state level agency that makes rules for real estate transactions.

Conveyance—is the act of transferring an ownership interest in real property from one party to another. Conveyance also refers to the written instrument, such as a deed or lease that transfers legal title of a property from the seller to a buyer.

Escrow—refers to money held by a third-party on behalf of transacting parties. The duty of a title and/or escrow company is to act as a neutral third party. The escrow company holds all documents and money until all of the terms and conditions in the contract have been met and the property is in title insurable condition. The transfer can then be made from the Seller to the Purchaser. Title companies do not work for the Seller or for the Purchaser. They are employed by both parties and act only upon mutually agreed upon written instructions. In Arizona, a title company, or an escrow company, rather than an attorney, serves this purpose.

Title—is a bundle of rights in a piece of real estate in which a party may own either a legal interest or equitable interest. The rights in the bundle may be separated and held by different parties. It may also refer to a formal document, such as a deed, that serves as evidence of ownership. Conveyance of the document may be required in order to transfer ownership in the property to another person.

Title insurance—is a form of indemnity insurance which insures against financial loss from defects in title to real property and from the invalidity or unenforceability of mortgage loans. The vast majority of title insurance policies are written on land within the United States. Unlike some land registration systems in countries outside the US, the US states' recorder of deeds generally does not guarantee indefeasible title to those recorded titles. Title insurance will defend against a lawsuit attacking the title or reimburse the insured for the actual monetary loss incurred up to the dollar amount of insurance provided by the policy.

Listing Agent—represents the seller in a real estate transaction.

Buying Agent (also known as Selling Agent)—represents the buyer in a real estate transaction.

Compliance

Real estate transactions are complicated and time consuming. Currently, such transactions are performed manually by a real estate agent or broker for a stakeholder, which is commonly the buyer or seller of a property that is the focus of the transaction. The manual process includes identifying and collecting required documents for all governing jurisdictions, identifying and applying all relevant and current jurisdictional regulations to the documents, populating the document with required data, checking that the populated data is consistent, accurate and compliant with the regulations, revising the documents when information changes, incorporating new information arising from negotiations between the parties of the transaction, adding new documents when new requirements are enacted, providing the completed documents to the other party of the transaction, and coordinating signatures of the documents. However, due to the increasing number of documents and constantly changing regulations, there is a substantial risk of human error, which can, at times, invalidate the transaction. Further, even if the documents are completed electronically, computers are currently unable to verify or ensure compliance of the populated data based merely on the electronic preparation of the transaction documents.

Automatic document transformation and compliance can prevent error and reduce an amount of time required to identify and complete the required documents. However, automating such document transformation, especially for real estate transactions, is challenging and many factors must be considered to ensure that automated document transformation and compliance is accurate, quick, and reliable. The challenges include designing representations for documents and document packages that enable both human usability and automation. Specifically, the document information should be presentable in natural language, able to be printed or presented in digital media, while also ensuring that the information is in a form practical for information processing. The information processing can include symbolic and numeric processing of data values entered into the documents, including determining whether fields are populated with proper values, enabling entry of data fields manually or automatically and comparing the data values with reference values and constraints. To perform such steps, information processing can require access and integration with one or more databases, networked information exchange with trusted and authoritative servers, and maintaining a history or log of changes to the documents and data values. Other challenges include integrating automated information processing with ongoing human activities with respect to the documents, including automatically keeping track of a status of multiple interdependent activities and related services, coordinating activities and document changes, and managing incremental and ongoing document and information changes, such as ensuring compliance when information changes during a transaction. To overcome such challenges, the automatic document transformation system, as discussed in detail below, includes a multi-tier system that utilizes data models for checking and automating compliance, as well as computational agents, and multiple networked, authenticated and cloud-based servers, which allow a computer to perform the task of compliance. A compliance status of documents and field values can change as information changes during a transaction.

Compliance System Architecture and Operation

Document transformation and compliance checking reduces errors during real estate transactions to ensure that the transactions are successfully and timely completed. FIG. 1 is a block diagram showing a system for document grouping and transformation, in accordance with one embodiment. Real estate agents 11 or brokers 12 assisting a party or stakeholder 13 to a real estate transaction can access a compliance server 15 via an internetwork 29, such as the Internet, to identify, prepare, and verify documents for the transaction as a compliance system 15. The real estate agents and clients of the real estate agents or brokers can access, fill in, and sign documents for the transaction. In a further embodiment, the compliance system 15 can be executed by two or more servers.

In one embodiment, the compliance system 15 can operate via a cloud computing environment, which allows users, such as the agents, brokers, and parties to the transaction, to access and utilize remotely-stored applications (not shown) of the compliance system without requiring the users to install software or personal data. The users can access the compliance system 15 via a computing device, such as a computer or a mobile computing device (not shown), including a cell phone, laptop, or tablet.

The compliance system 15 can include a compliance information management system 16, a compliance performance system 17, a compliance outreach system 18, an input port 31 to receive compliance rules, databases of addresses and document templates, and an output port 32 to provide populated and checked document packages for a transaction. The compliance information management system 16 encodes information and logic representations for automating compliance of the transactions. Real estate subject matter experts 14 and information technology specialists 30, among other individuals, are responsible for the creation and maintenance of the information and logic used by the compliance system 15. For example, subject matter experts 14 can curate and annotate a library of documents 24 for real estate transactions that is stored by a database 19 associated with the compliance system 15. The library of documents is discussed in detail below with respect to FIG. 10. The documents reflect different jurisdictional transaction requirements, including federal, state, county, city, and local compliance requirements. Meanwhile, information technology specialists 30 can encode, check, embed, and maintain compliance logic executed by computational agents of the compliance system with the documents in the library and associated databases.

The information management system 16 also enables the compliance performance system 17 to support and automate real estate transactions. For instance, the compliance performance system 17 records information for a transaction, selects a set of documents for the transaction based on at least a portion of the recorded information, and transforms documents in the set by populating form elements of one or more of the documents processed by the information management system 16. The real estate brokers 12, agents 11, support staff, and parties 13 can provide the information for the transaction via a form or coversheet. Based on the received information, the compliance performance system can populate the documents on which automatic compliance is performed.

During or after population, the performance system 17 performs compliance checking of the document set for consistency, correctness, completeness, and compliance, as well as confirmation. The compliance outreach system 18 interacts with third-party institutions 20, 22, as authoritative sources, to access transaction documents 28, jurisdictional regulations 27, property records (not shown), and financial data 26 for compliance checking with the set of populated documents. The third-party institutions can include city or county property records, real estate boards, financial institutions, or jurisdictional real estate regulatory institutions, including federal, state, county, city and neighborhoods jurisdictions. Other third-party institutions and document types are possible.

Any errors in the documents regarding consistency, completeness, correctness, and compliance of the data can be identified via the performance system 17. In one embodiment, errors are detected at the time data is entered. The error can be flagged, making a visible note for stakeholders and preventing an erroneous value from being accepted and propagated in the document set. The note can suggest corrections to the data entry or prompt a user to correct the entry at that time. In another embodiment, the errors can be automatically corrected; however, in a further embodiment, a notification can be transmitted to one or more of the broker, agent, or stakeholder for correction. Any time new data is entered, the compliance checking process can automatically occur to ensure that no errors are present in the transaction document set. Once the documents are complete and correct, the documents can be provided to the other party of the transaction for review and possibly, further revision.

Figure 2:
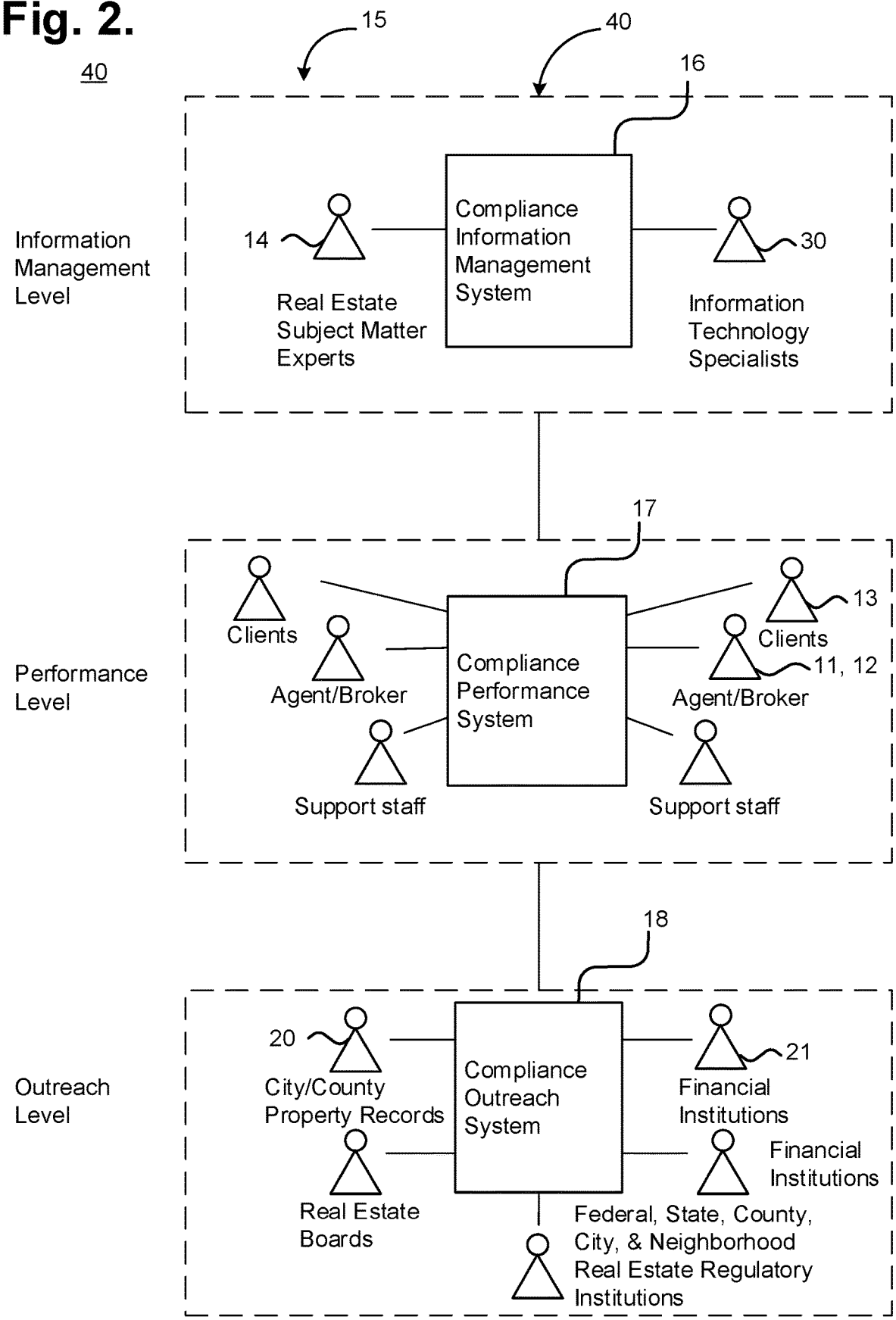
FIG. 2 is a block diagram showing, by way of example, the compliance system of FIG. 1.

The compliance information management system 16, compliance performance system 17, and compliance outreach system 18 work in conjunction with each other to automate document transformation and compliance checking. FIG. 2 is a block diagram 40 showing, by way of example, the compliance system 15 of FIG. 1. As described above, the compliance system 15 includes the compliance information management system 16, the compliance performance system 17, and the compliance outreach system 18. At the level of the compliance information management system 16, real estate subject matter experts 14 and information technology specialists 30 provide information and logic representations that are encoded and saved for performing compliance checking of the populated documents for a real estate transaction.

Documents are identified and populated at the compliance performance system level 17 during which users, such as brokers, agents, and stakeholders to the transaction provide data regarding the transaction for populating at least a portion of the documents using the information and logic representations from the information management system 16. Once populated, compliance logic from the information management level 16 is applied to the documents to check for correctness, completeness, consistency, and compliance of the data and the documents, using the information gathered by the compliance information management system and the compliance outreach system. Prior to or during the compliance checking, the compliance outreach system 18 performs interactions with third party systems to obtain additional information against which the populated documents of the transaction documents are checked.

Documents and Data Fields

Figure 3:
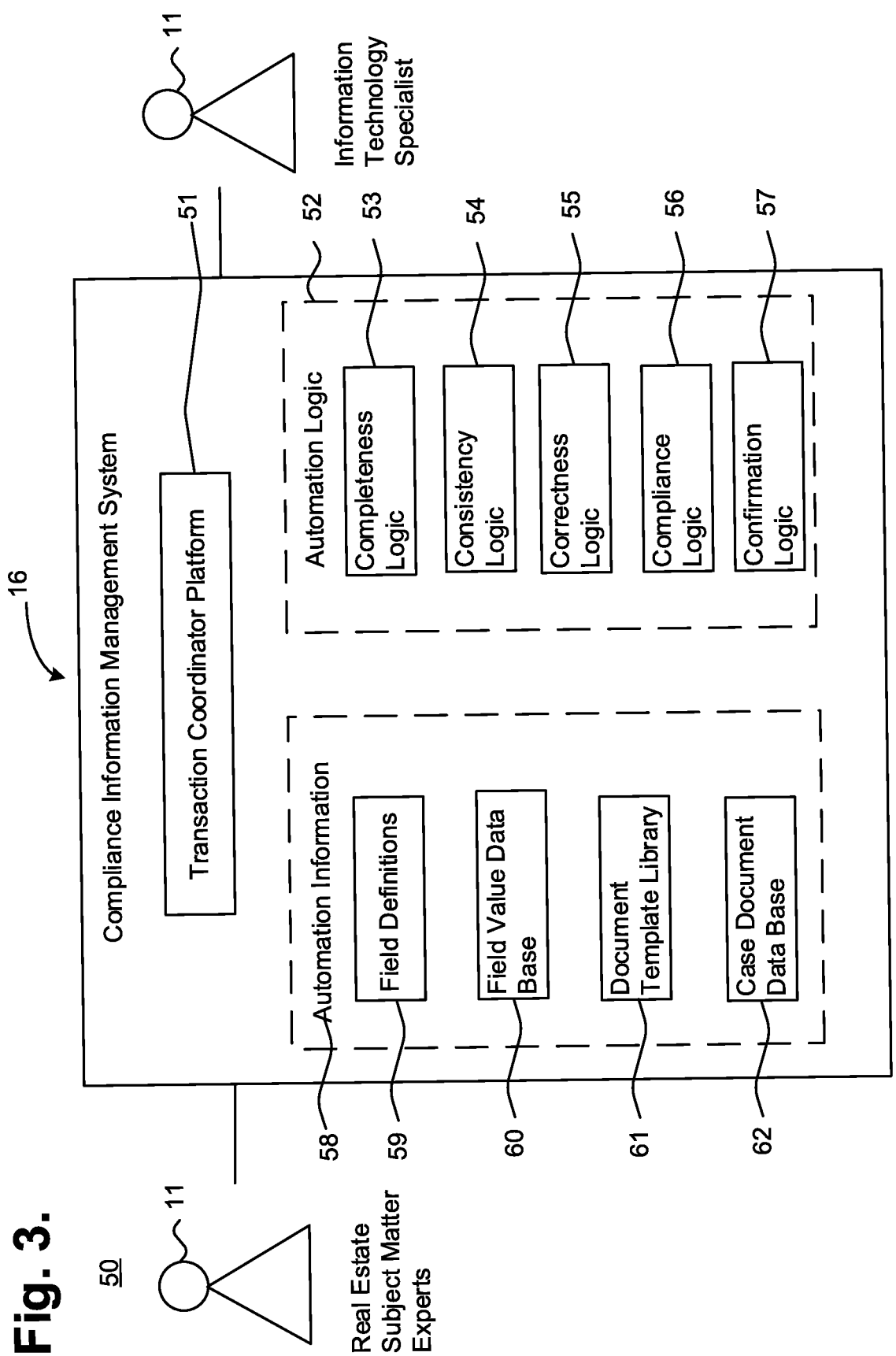
FIG. 3 is a functional block diagram showing, by way of example, the compliance information management system of FIG. 2.

Ensuring accurate document transformation and compliance requires automation information and logic representations. FIG. 3 is a functional block diagram 50 showing, by way of example, the compliance information management system 16 of FIG. 2. Real estate subject matter experts and information technology specialists, among other qualified individuals, enter automation information 58 and automation logic 52 via a transaction coordinator platform 51. The automation information 58 can include field definitions 59, field values 60, a library of document templates 61, and case documents 62, which are human-readable forms of a current state of transaction documents for each transaction, while the automation logic 52 can include population logic (not shown) that performs document population and revision, and review logic to ensure compliance, correctness, completeness, and consistency of the populated documents.

The document templates 61 can be obtained from jurisdictional real estate organizations, generated by the subject matter experts, or uploaded via the subject matter experts or a third party, as well as from other sources. Generally, each jurisdictional real estate organization requires a pledge to a code of ethics and implements a standard of practice required by all members. Many brokers and realtors belong to one or more organizations to utilize document templates prepared, maintained, and updated by the organizations. When new real estate regulations are implemented or laws are enacted, federally or by state, those real estate organizations covering the affected jurisdictions work to revise their documents and ensure that their templates are up to date and in compliance with the new regulations or laws.

Each of the documents in the template library 61 includes multiple form elements for entry of transaction data, including data field values, which are each stored in a data field, such as in a database or spreadsheet. The data fields values are used within a data model for checking and automating compliance, and are accessed for populating the form elements. A real estate document template can include form elements for party names, street address, city, county, zip code, and sales price for the property of the transaction. Each data field that stores a data field value is associated with a data field definition 59, which can be human-readable information describing that data field to which the data field definition is assigned. The data field definition is also associated with a data field identifier, such as a string of numbers and letters, that uniquely identify a specific data field in the database.

The information of the data field definition can include one or more of a text comment describing a meaning of the field, a data type, routines for converting a value into printable text, computational modules for carrying out operations on a field, and a syntax checker. For example, a data field definition for a property address can include a data field name of "street address," a data field identifier of "Street.Address.1," a data type of "street-address," a description of "this is the first street address for the property, must include a number and a street name, and be consistent with a lot number in county records," and a module for operations to carry out entering, printing, checking, comparing a received data value to trigger compliance checking and syntax checking.

The data field identifiers and names index access to populated data values for information processing and support specific access for automating document population and compliance checking, including completeness, consistency, correctness, compliance, and confirmation processing. Specifically, the syntax checker can be used to look up a data field value for populating a form element based on the data field identifier of the data field definition associated with the data field and a transaction identifier assigned to the transaction. For example, returning to the street address example above, a property transaction, in which the data field for street address has been populated, can have an identifier "Trans CAL-387654-Smith-Jones-31 Dec. 2018." Based on the transaction identifier and the data field identifier, the street address data value "1302 Broadway E" is accessed and used to populate the data field. Data field identifiers and names for related data fields within a single document or across different documents are the same for different transactions. However, data values populating the data fields are specific to a transaction and are usually different for different transactions. Each transaction can be associated with a data model, which can include the data field identifiers or names for documents in a document package for the transaction and data values that populate data fields associated with the data field identifiers. The data models are discussed in detail below with respect to FIG. 9.

In one embodiment, the field definitions 59 are stored in a persistent data access system, such as a relational database or a NOSQL database. The database is a reference source for field definitions. However, other kinds of linked data structures for the field definitions are possible, such as hash tables, tree-based structures, and look-up representations and information retrieval structures.

In a further embodiment, the field definitions 59 are distributed and combined with a library 61 of the document templates so that the field definitions 59 are defined and stored in a distributed fashion across a set of document templates, rather than in a monolithic database for all document templates. In such embodiments, a document template is designated a reference template and the source of the field definition. Having data represented as explicit data fields enables controlled and specific access to the compliance data and enables automating compliance checking and enforcement.

To access data values and populate form elements in the document templates, the field definitions can be associated with the form elements, such as via a look-up table or stored with the form elements. FIG. 4 is a diagram showing, by way of example, an interactive form 130 for form element identifiers 135. The interactive form 130 can be delivered via a web page or directly by an application. The interactive form 130 includes a listing 131 of "form elements" 135 that can be defined by a real estate expert or information technology specialist and associated with a data field in a document template. Each form element 135 can be represented by a data box in a template and listed via a form element identifier 131. For each form element, the interactive form 130 can provide a name 132 of the element and actions 133, which can be performed for or on the form element that corresponds with the form element identifier 131 and name 132. The actions can include printing of an associated data value, triggering when the data value has changed, converting the data value from a numerical value to text and vice versa, and when a new data value has arrived. Other actions are possible. New form elements 135 can be added using an "add form element" button 134.

Figure 5:
FIG. 5 is a diagram of an interactive form showing, by way of example, a document template with defined form elements.

Data field definitions can be assigned to the form elements within documents templates by a subject matter expert or real estate professional that can work with information technology specialists to define the data fields. FIG. 5 is a diagram of an interactive form 140 showing, by way of example, a document template 143 with defined form elements 144. The interactive form 140 can include a data frame 141 and a display frame 142, and is displayed to the real estate experts and information technology specialists for entering field definitions to the document templates. The data frame 141 can provide tabs for metadata 141, inputs, and experts, as well as other tabs. The meta data tab 141 provides information for defining the document template 143 and can be populated by the real estate experts and information technology specialists. In turn, the defined document template is provided to the users, such as the real estate agents and clients. Under the metadata tab 141, document information fields can be provided, including a date that the document template was published and last edited, the document name, the date the document template was last revised, a type of transaction covered by the document, and a locale represented by the document.

The display panel 142 can display one or more pages of a document template 143. Each document template displayed can include one or more form elements 144, at least one of which is defined for automated population and compliance. Each defined form element 144 is associated with a data field identifier that indicates a type of data to populate that data field. The defined form elements can be highlighted, color coded, or otherwise marked to indicate a blank field that must be populated by the user.

Figure 6:
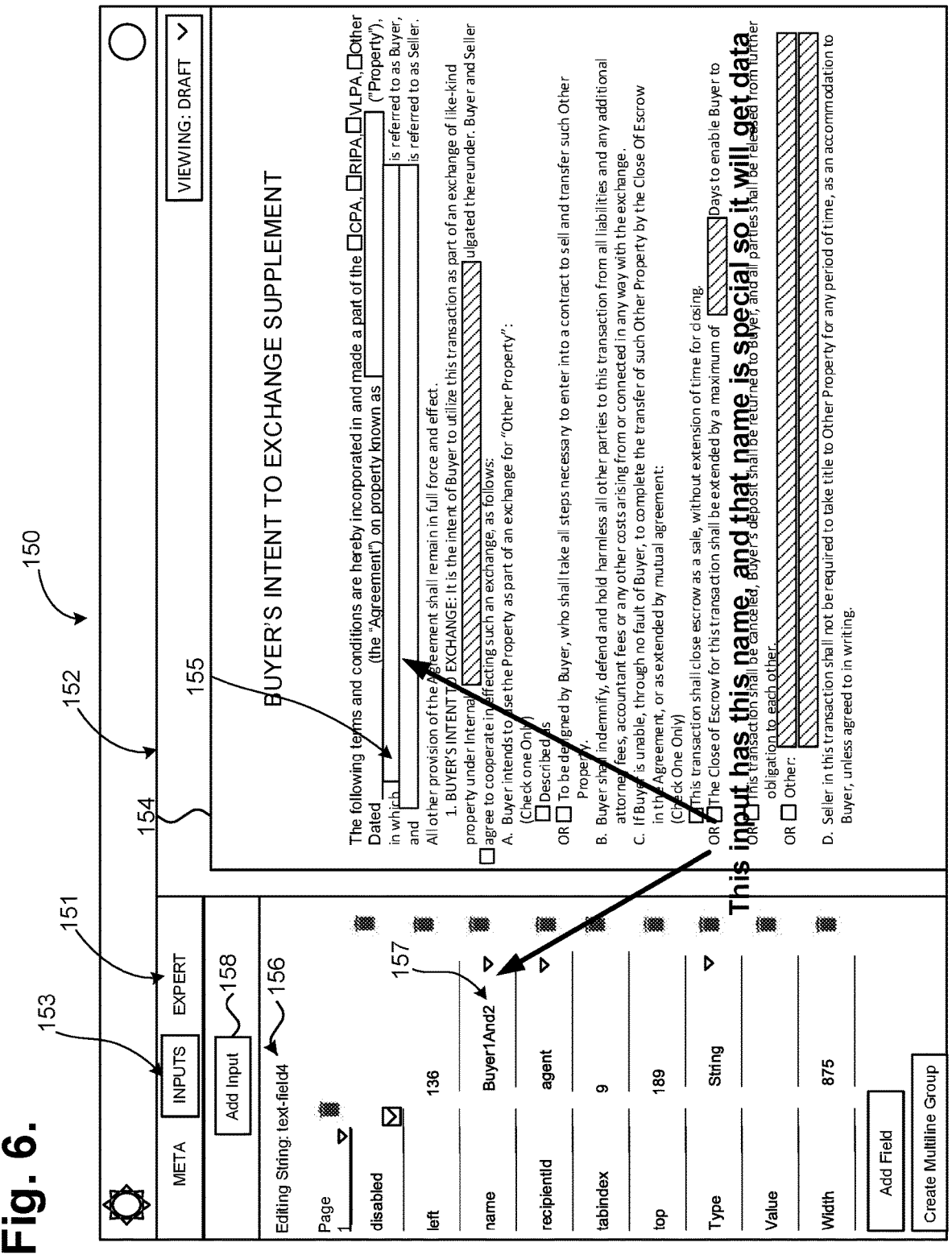
FIG. 6 is a diagram of an interactive form showing, by way of example, information for generating a data field identifier associated with a data field in a document template.

The inputs tab of the data frame can be used by real estate experts and information technology specialists to define a form element with a data field definition or provide information about the field definition associated with that form element. FIG. 6 is a diagram of an interactive form 150 showing, by way of example, information for generating a data field identifier associated with a form element in a document template. The interactive form 150 can include a data frame 151 and a display frame 152. The data frame 151 can include tabs for metadata, input 153, and expert, while the display frame 152 can display a document 154 or a portion of a document 154 with one or more data fields 155. When the input tab 153 is selected, a form element 155 can be defined using an "add input" button 158 after providing information about the form element, including providing an editing string, which can be the form element identifier 156, a page of the document displayed, and a name 157 of the form element identifier, which in this example is "Buyer1And2." Other information, such as tabIndex, top, type, value, and width can be used for formatting of the data field to populate the form element with a data value. The form element identifier 156 provides that the name of Buyer 1 and Buyer 2, if any, should be entered into the form element 155 for which the data field identifier 156 is associated. Under the input tab 153, programming information for triggering processing logic is also included. For instance, selecting a particular box, may add additional form elements to the form for answering by the user or add additional documents to the document package.

A data field definition can also be included in the inputs tab to provide information about the type of data to populate the form element, as well as information regarding where to access the data once received and how to process the data. Once the form elements of a document template have been defined, the template can be added to the document library for access and use by real estate agents for real estate transactions.

Returning to the discussion with respect to FIG. 3, users, such as real estate agents or clients, populate the defined form element with data values, which can be stored in the field value database 60. In one embodiment, the data field values 60 are stored in a persistent data access system, such as a relational database, NOSQL database, or any other persistent data structure that can provide similar indexing functionality. The database 60 functions as a reference source for the data values for all of the documents in the package associated with the transaction. Additional information to assist information processing can be stored together with the data field values or in additional storage. The additional information can include date and time the data was last changed, provenance information about who entered the data or where the data originated, and links to related information, such as confirmation information that logs whether a stakeholder or user has confirmed receipt and acknowledgement.

Automation logic utilizes the automation information, such as the data field identifiers 59, to create and maintain accurate information for automating compliance. The subject matter experts and information technology specialists generate automation logic 52, which includes population logic for automating document transformation and review logic for performing compliance checking of the documents. The review logic can include logic for completeness 53, consistency 54, correctness 55, compliance 56, and confirmation 57, which is encoded by the compliance information management system, to automate compliance of the documents for a transaction. Completeness logic 53 ensures that all required documents for a transaction are included in a document package and that all required form elements for each document in the package are populated. Consistency logic 54 ensures that related fields in the documents are populated in a semantically-consistent way, as further described below with respect to FIG. 14. Correctness logic 55 ensures that the data field values are verified by authoritative sources, as described below in detail with respect to FIGS. 8, 13A, and 13B, and compliance logic 56 ensures that the packaged documents for a transaction comply with all regulatory requirements. Confirmation logic 57 ensures that all of the required signature and date fields in the packaged documents are populated.

Generating Document Packages

Figure 7:
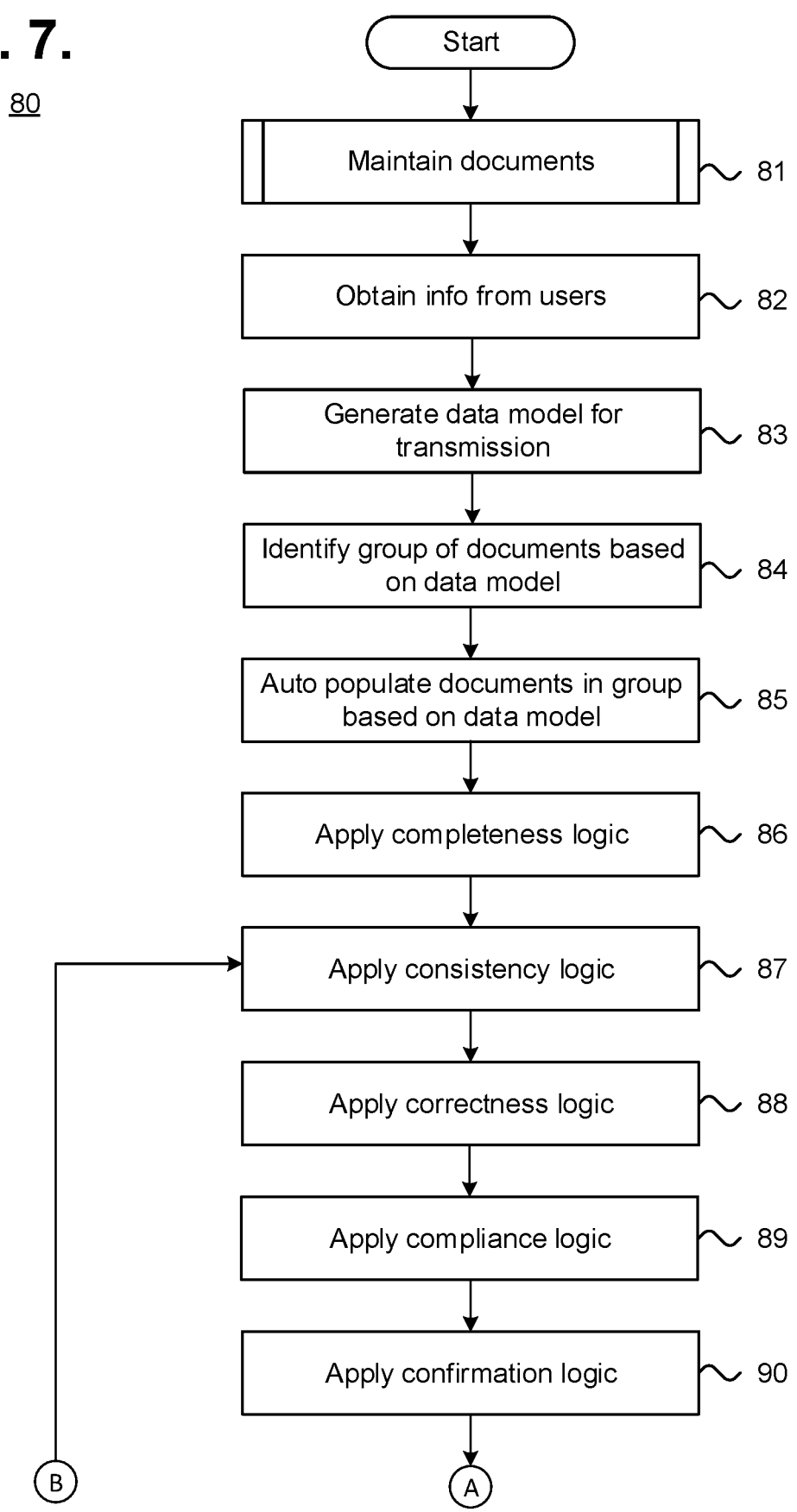
FIG. 7 is a functional block diagram showing a method for document transformation and compliance, in accordance with one embodiment.

Each property transaction generally requires a large amount of documents to be completed. Automated document transformation and compliance provides convenient, accurate and timely checking and transformation of the documents to prevent errors. FIG. 7 is a functional block diagram showing a method 80 for document transformation and compliance, in accordance with one embodiment. A library of document templates for real estate transactions is maintained (block 81) for a plurality of jurisdictions. The maintained documents include templates from different real estate organizations or that are newly generated. Each document template in the library has been processed by real estate experts and information technology specialists to group documents for different transactions in different jurisdictions and to define the form elements. The documents can be grouped using a document identifier or by storing related documents in folders; however, other methods for grouping documents are possible.

A user accesses the document transformation and compliance system to generate a document package for a transfer of real property, such as a sale or purchase of the property. The user can include a real estate agent, broker, or other types of real estate professionals, as well as a party to the transaction. Different documents are relevant and appropriate for different stakeholders, which consequently have access to different documents in the document package. For example, a listing agent can create transaction documents shared between a property seller and the listing agent, such as a listing agreement, as well as documents that are provided to another party of the transaction, such as a counteroffer, which is compliance checked and included in the property transaction itself. Similarly, a selling agent can create transaction documents shared between the selling agent and client, and transaction documents, such as an offer, that are provided to another party to the transaction. Further, different users can have different access to the data transformation and compliance system. For instance, real estate agents and brokers cannot sign on behalf of the buyer or seller, whereas the buyer and seller may not be able to access the same document templates as the real estate agent or broker, such as when the documents are only available based on membership in an organization from which the documents originated.

Upon access, the user can provide (block 82) information about the property transfer, such as a type of property transfer or property address, price, type, and owner, via a cover sheet. Specifically, the information can be provided as data values that populate the form elements in the documents. Other types of information are possible.

Based on the data values received from the user, a data model is generated (block 83). The data model can include the data values and data field identifiers for corresponding data field definitions, as well as additional information. Additionally, the data model is updated as data values change, new documents are added, and new form elements are added. Data models are discussed in further detail below with respect to FIG. 9.

Prior to, simultaneously or after generation of the data model, a package of document templates for the transaction can be generated (block 84) based on the received data values. For example, upon receipt of the transaction type and property address, a set of compliance rules can be identified and subsequently, the identified compliance rules can be used to identify documents for including in the document package for the transaction. For example, at least a portion of the documents associated with the city, county, or state in which the property is located can be used to generate the document package. Further, properties located in a particular location may be part of a homeowner's association and the rules of the homeowner's association will apply to the property in the transaction. The document package can be automatically generated based on the received data values or selected by a user. Additionally, the document package can be generated based on a combination of automatic generation and user selected generation. At any point prior to providing the document package to the other party, documents can be removed or added to the package.

Once identified, the documents in the package can be auto-populated (block 85). Specifically, form elements within the documents are populated (block 85) with data values from the cover sheet based on the data field identifiers associated with the form elements. Any form elements in the documents not automatically populated can be filled in by the user. For automatic population, data values from the coversheet, which can be stored in a database with field identifiers, are used as reference sources for populating the form elements of the documents with data field values. Other reference sources for populating the form elements are possible, such as other documents, as discussed in detail below with respect to FIG. 9. The documents can be populated once identified and if further documents are later added to the package, auto-population can occur once the document has been added. Auto-population is also used when data values are changed. For example, if the price of the property changes in one form element, the new price is entered in the data model and will be used to replace the old price in the other documents in the package.

Additional information can be stored with the populated form element values or in additional storage accessible using case and field identifiers. The additional information can include date and time the data was last changed, provenance information about who entered the data or where the data originated, and links to related information, such as confirmation information that logs whether a stakeholder has confirmed receipt and acknowledgement of the data values.

During or after data population, review logic, such as completeness logic (block 86), consistency logic (block 87), correctness logic (block 88), compliance logic (block 89), and confirmation logic (block 90) can be applied to the document package to ensure a validity of the data values. In one example, the review logic is applied in real time as the data values are being entered in the form elements, either via auto-population or via the user. Additionally, the review logic can be applied at a later time, such as all the required data is entered in the documents. For instance, for related form elements, checking cannot occur until multiple fields are entered, either in the same document or across different documents.

The review logic can be applied separately or simultaneously. Once the documents in a package have been checked for compliance, consistency, correctness and completeness, any identified errors or inconsistencies can be automatically corrected or a notification can be provided to the user to correct the error. Once the document package satisfies all checks for completeness, consistency, correctness, compliance, and confirmation, the document package can be provided (block 91) to the other party to the transaction.

However, prior to providing the document package to the other party or after providing the package, updates (block 92) to one or more of the form elements may be required. For example, the other party receiving the document package may want to change a term or form element value in one or more of the documents. Alternatively, one or more terms of the transaction may change, such as based on an outcome of the property inspection or by mutual agreement. Additionally, regulations regarding the transaction can change and must be reflected in the document package. All such changes must be reflected in the transaction documents.

A change to a value populating a form element in a document could, for example, occur via a user interaction when the document is stored in the compliance system or by a fresh upload of a copy of the document. Every change to a data field value is logged and time-stamped. Whenever a new value of the form element becomes available to the compliance system, the system updates the data value in the caching database. Additionally, whenever a new copy of the reference document is made available to the system, the system synchronizes the data so that the most recently updated value is reflected in the database for populating form elements. Other implementations for storing the data field values are possible. In each variation, consistency rules assure that when a change to a referenced data field value for a document package becomes known, the new data value is propagated to derivative form elements across the documents in the document package. To maintain transparency and consistency, the compliance system keeps a log showing the dates and times of any change, and indicates where reconfirmation is required of any stakeholder's acknowledgement of a value. The log can be used to verify and confirm certain changes, as well as track the user that made the change should a dispute regarding the property arise.

If any updates (block 92) to a data field value are necessary, one or more data field values are changed (block 93) and propagated across the documents in the package. Additionally, a change can be made to a form element and that change is updated to reflect across all document templates in a document package that include that form element. Subsequently, the review logic, including completeness logic (block 86), consistency logic (block 87), correctness logic (block 88), compliance logic (block 89), and confirmation logic (block 90) is applied to the updates. Otherwise, if no updates are required, the document package is considered to be successfully complete and can be provided to the other party.

Process and Document Transformations

The document transformation and compliance system helps reduce the amount of time required for preparing documents for a real estate transactions, such as a sale or purchase of property, and increases confidence that the documents are accurately prepared. Generally, during a property sale and purchase transaction, a potential purchaser reviews multiple properties, which have been listed for sale. Each listed property requires a listing agreement, which includes large amounts of information that must be correctly listed for the property and comply with jurisdictional regulations.

Eventually, the potential purchaser identifies an available property for sale and generates an offer for sending to the seller of the listed property selected. Generating the offer can be tedious and time consuming based on the information that must be provided and disclosed. Once the offer is accepted, all paper work for the transaction must be completed before closing. Such paper work includes documents relevant to the particular property and transaction, and can include proof of title search, insurance, flood certification, proof of homeowners insurance and mortgage insurance, home appraisal, inspection reports, and closing disclosure, among other documents, such as carbon monoxide detector notice, new construction addendum, vacant land listing agreement, and water heater statement of compliance. Other types of documents are possible.

Figure 8:
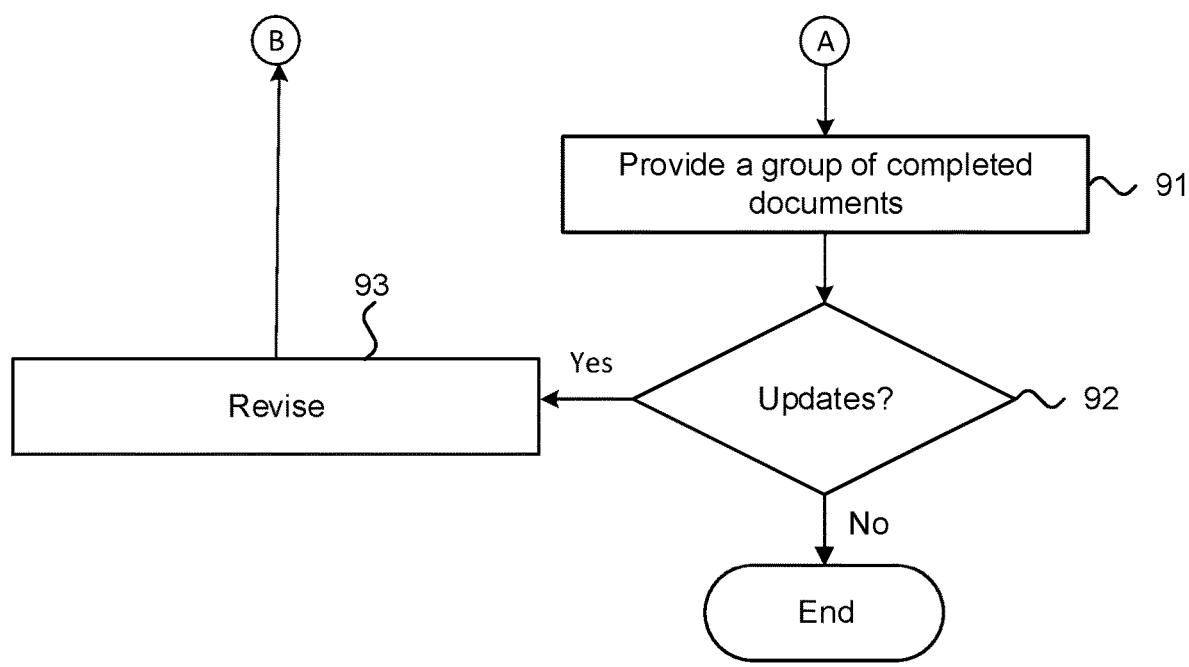
FIG. 8 is a diagram of a webpage showing, by way of example, a transaction cover sheet with data fields for obtaining data values.

Users can utilize the document transformation and compliance system to prepare the listing, offer, and related documents. Such documents are prepared using information received from a user, such as via a questionnaire or cover sheet. FIG. 8 is a diagram of an interactive form 100 showing, by way of example, a transaction cover sheet 102 with form elements for obtaining data values. The interactive form 100 can include a navigation bar for an index 101 of pages for the transaction and a display of the cover sheet 102. The index 101 can include content links for the cover sheet 102, including a document link, listing services link, and marketing service link. The listing services and marketing services are described in commonly-owned U.S. Patent Application, titled "System and Method for Listing Document Transformation and Compliance," filed on Sep. 4, 2019, and U.S. Patent Application, titled "Blockchain-Based System and Method for Listing Document Transformation and Accountability," filed on Sep. 4, 2019, the disclosures of which are hereby incorporated by reference. However, other index links are possible, including purchase service links, which can be utilized by a buying party to the transaction, as described in commonly-owned U.S. Patent Application, titled "System and Method for Purchase Document Transformation and Compliance," filed on Sep. 4, 2019, and U.S. Patent Application, titled "Blockchain-Based System and Method for Purchase Document Transformation and Accountability," filed Sep. 4, 2019 the disclosures of which are hereby incorporated by reference.

The cover sheet 102 can include multiple form elements, which are used to generate a data model for the transaction. The data fields of the cover sheet can include fields for at least one broker or agent name 103, at least one party name 104, contract and market dates 105, and property information 106, including property identification number, street address, city, state and zip code, and purchase price (not shown). Further, data specific to a seller and his listing agent can be requested via the cover sheet, such as a lock box code to access a key for the property or a gate code to the property, as well as other types of property access information, such as a combination to enter a condominium complex. Other types of form elements are possible. A user, such as an agent, broker or stakeholder, can populate the form elements of the cover sheet 102 with data field values that are used for generating a data model to identify a document package and perform compliance checking. Once the cover sheet has been completed, a check mark or other symbol or color can be used to provide a status of the cover sheet in the index 101, which in this case, is complete.

In one embodiment, one or more compliance checks can be applied via the review logic as the data values are entered into the cover sheet. For example, correctness logic can be used to check data values entered into the form elements of the cover sheet. Specifically, the data values can be checked to prevent propagation of incorrect information in the other documents of the document package. For example, a real estate agent is completing the cover sheet for his client, the seller, and fills out the seller's email address as adam.able.g-mail.com. The correctness logic identifies that the email address is invalid due to lacking the conventional syntax character "@" to separate the name of the email holder from the name of the email service and marks the incorrect data value as an error. The error can be provided as a pop-up message or by highlighting the incorrect data value, and can be removed upon correction of the data value. Other displays of the error notification are possible.

The correctness logic can also connect to authoritative sources to retrieve authoritative information for checking the data values. For example, the property for sale is located at 1120 Rose Avenue, Mountain View, Calif. 94040. As the real estate agent types in the address "1120 Rose," an authoritative source, such as a multiple listing service database, is accessed to obtain and display valid property addresses matching the partial address entered. The real estate agent can then select the property address representing the property for sale by Adam Able. Consistency and compliance logic can also be applied to the data values entered in the cover sheet.

Data Models and Process Logic

Figure 9:
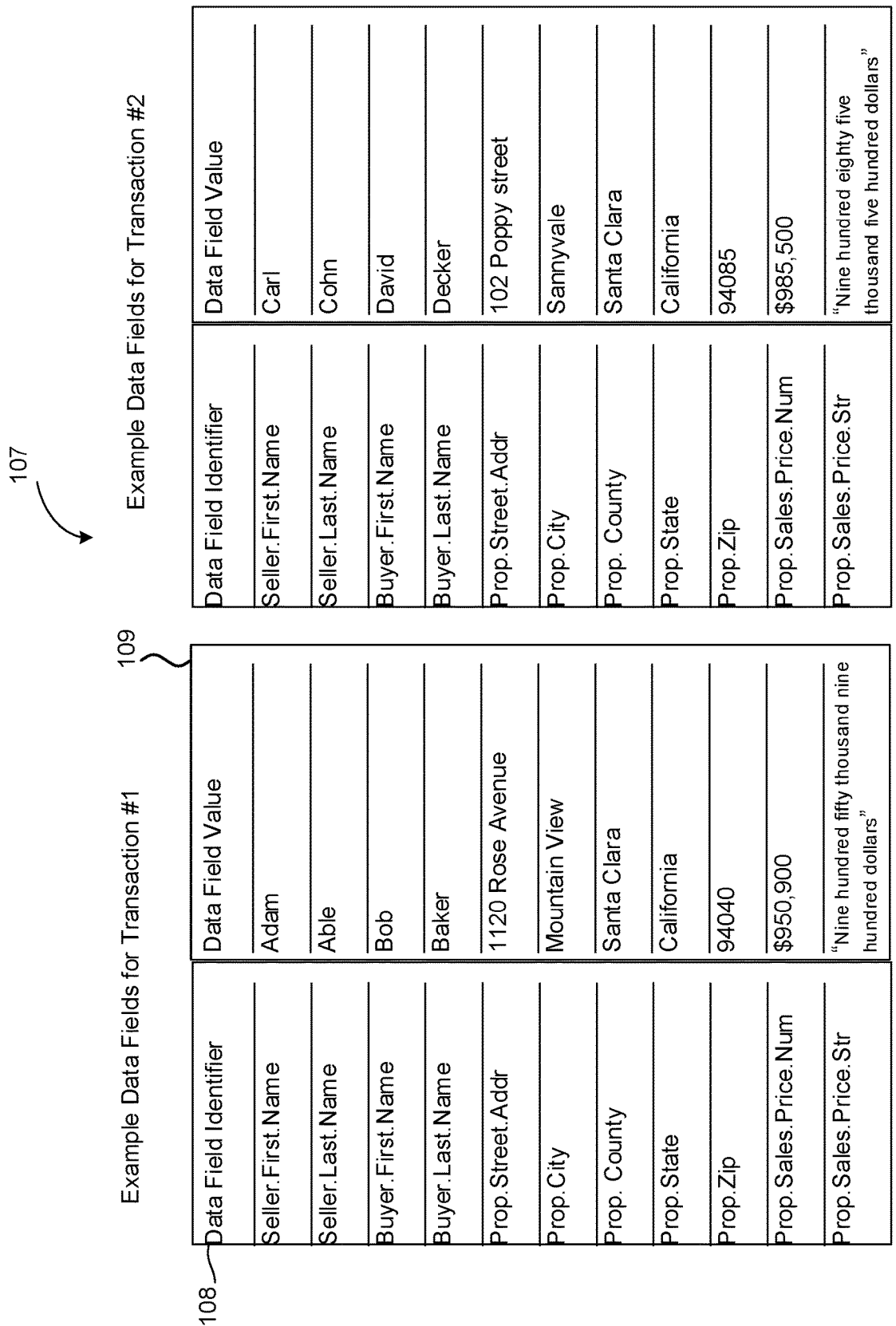
FIG. 9 is a block diagram showing, by way of example, data models.

Once obtained and checked, the data values of the cover sheet are used to generate a data model. FIG. 9 is a block diagram showing, by way of example, parts of data models 107 for different transactions. Each data model can include data field identifiers 108 and data field values 109. In this example, the data field identifiers are associated with a form element in the cover sheet and documents in the library. The data field values are used to populate all form elements with the corresponding data field identifier. The same data field identifiers can be used across documents, as well as transactions; however, the data field values differ for each transaction.

Returning to the above example regarding seller, Adam Able, the seller name is split into two fields with the field for first name associated with a field identifier "seller.first-.name" and the field for last name associated with the identifier "seller.last.name." The received data values of Adam for first name and Able for second name are stored with the associated identifiers in a data model having an extensible set of data field identifiers for accessing and displaying information populating the documents. All the received data values in the cover sheet and document templates for the property transaction can be stored together as the data model.

Once generated, one or more data values from the data model can be used to identify rules for a particular transaction and the identified rules can then be used to select documents for a document package for the transaction. However, prior to generating a document package, the data values from the data model can be used to populate a disclosure document outlining a relationship between a real estate agency and a seller or buyer. The template for the disclosure document can include interactive fields for ensuring acknowledgement by the seller or buyer, and signature, date, and license fields.

Once the relationship between the real estate agent and buyer or seller has been established, documents can be selected from a document template library for inclusion in the document package. FIG. 10 is a diagram showing, by way of example, a part of a document template library 61. The library 61 provides a listing of document templates 70 that are necessary for meeting compliance regulations and practices for different jurisdictions. Each document template 70 can be stored with information, including template name 71, a date of last revision 72, whether the document appears in a listing 73 of documents relevant to the listing agent and seller, whether the document appears in an offer 74 for the property, last publication date 75, last edit date 76, locale type 77, and assigned locale 78. The assigned locale 78 can list the jurisdiction which requires the document, while the locale type 77 provides a classification for the type of jurisdiction, including city, county, or state, as well as other types of jurisdictions. In one example, each document template 70 can be accessed by clicking on the template name. Further document templates 70 can be added using an "add document template" button 79.

To generate a document package for a transaction, one or more data values received via the cover sheet, such as the property address, can be used to identify a set of rules for the transaction. Subsequently, based on the identified rule set, one or more documents can be selected from the library to form the document package. The transaction can be assigned a unique transaction identifier, which can then be used to uniquely identify the document package. For example, the transaction identifier can be a unique number or string, or could be generated as a string that includes some human-interpretable information, such as the real estate agent's name, seller's name, and a date together with a number.

As more data values are provided for the form elements, additional documents may be identified as required for the transaction. Accordingly, templates for those documents are instantiated and some of the field values can be filled in where they have already been established. In this way, the document package grows incrementally and automatically as needed.

Figure 11:
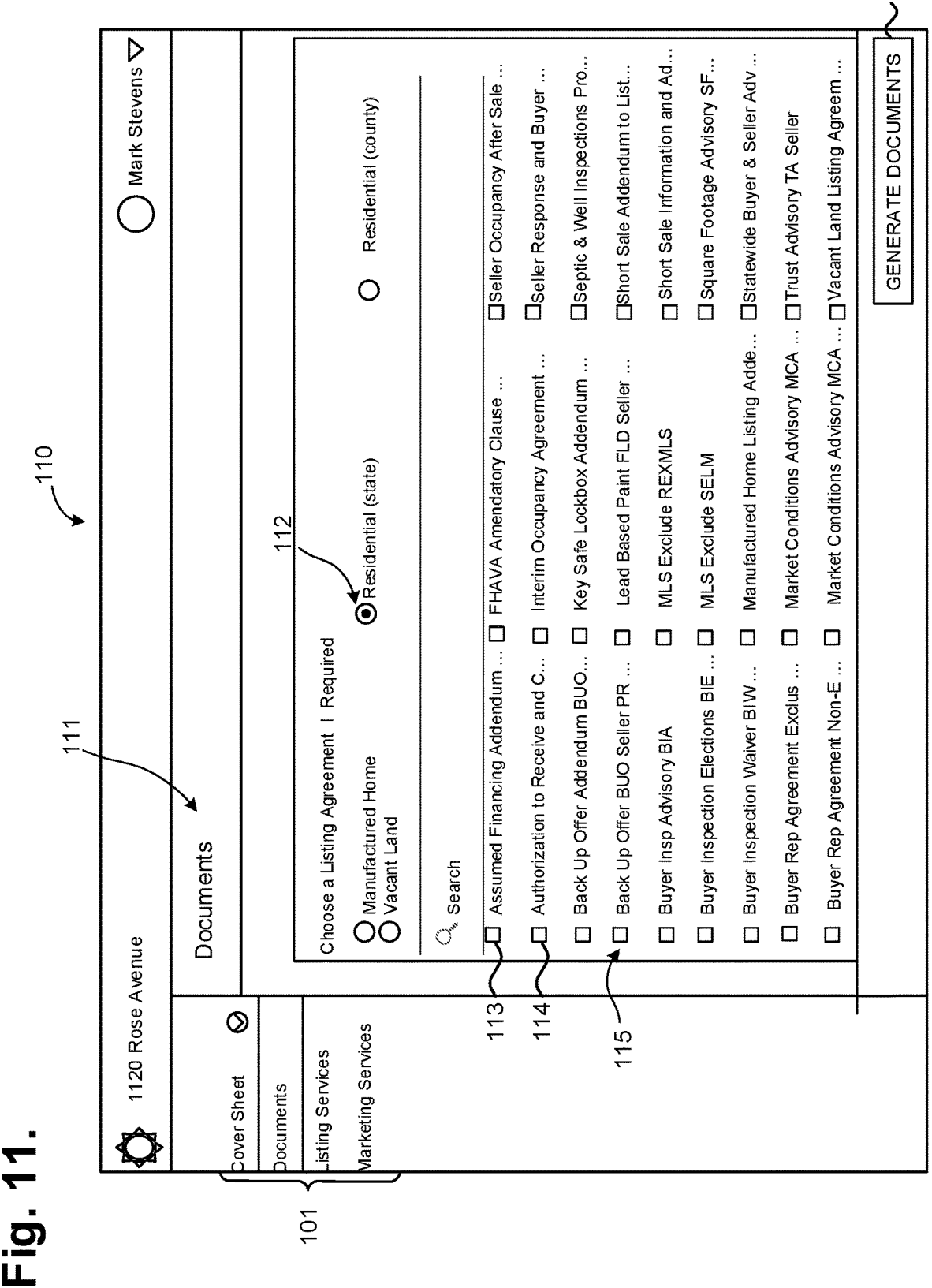
FIG. 11 is a diagram showing by way of example, an interactive form for identifying document templates for a transaction.

In one embodiment, a listing of document templates can be presented and an agent can select one or more documents to add to the document package, as needed. FIG. 11 is a diagram showing by way of example, an interactive form 110 for identifying document templates for a transaction. The interactive form 110 includes a navigation bar for an index of pages 101 and a documents section 111. The documents section 111 provides one or more property type selections 112, a search bar 113, and a listing 114 of document templates 115. The property type selections 112 can be identified and presented based on the address entered in the cover sheet and a type of transaction, such as a selling or buying transaction. Specifically, the address can be used to identify jurisdictional organizations that cover the location of the property, while the transaction type is used to identify listing or purchase documents. For example, a property located in Mountain View, Calif. must comply with real estate regulations enacted by the state of California, as well as any local regulations. To list the property located in the Mountain View for sale, document templates for listing agreements that comply with real estate regulations in one or more of California or locally are identified and presented. A listing agreement represents a contract between a real estate agent and an owner of the property to be sold and can include a list price for the property, a beginning and end date for the property listing, an amount of compensation for the real estate agent, and authorization for the agent to work with third parties to further the sale of the property, as well as other types of information. However, different listing agreements drafted by different organizations can include different conditions based on location, property type, and preference of that organization. For example, one professional organization in California includes, by default, a clause in the listing agreement that requires a property to be delivered to a buyer in operational order, while the listing agreement drafted by a different professional organization does not require, by default, the seller to make any repairs.

The property type selections for the Mountain View property can include a manufactured home, residential home or vacant land, or a residential home however, other property type selections are possible. Thus, document templates for listing agreements for each of the property types that conform with California and local regulations are identified and displayed. The user, such as a real estate agent or broker, can choose one or more of the transaction type selections 112 for generating a document package for the transaction. For example, if the property is a residential home, the user can select residential documents associated with the selected property types are displayed or selected for display in the document template list 114 in the document section 111. In one embodiment, all the documents associated with the selected property types can be selected for display and inclusion in the document package. Alternatively, all the documents associated with the selected property types can be displayed and a user can select certain documents for inclusion in the document package.

Further, the document section 111 includes a search bar 113, which can be used to identify additional document templates for adding to the document package. An agent may use the search bar if he or she has information about the property or transaction that is not evident yet from the information that has been entered in the active documents. In this way, the agent can add relevant documents to the package. For instance, the residential Mountain View property may have water conserving plumbing fixtures, which require an additional document for disclosure or is offered for sale as a short sale, which also requires additional documents. Accordingly, based on those special circumstances, the document templates are accessed via the search bar 113 and added to the document package. Further, the interactive form 110 can include a generate documents button 116, which allows a user to view the document templates selected for inclusion in the document package.

Figure 12:
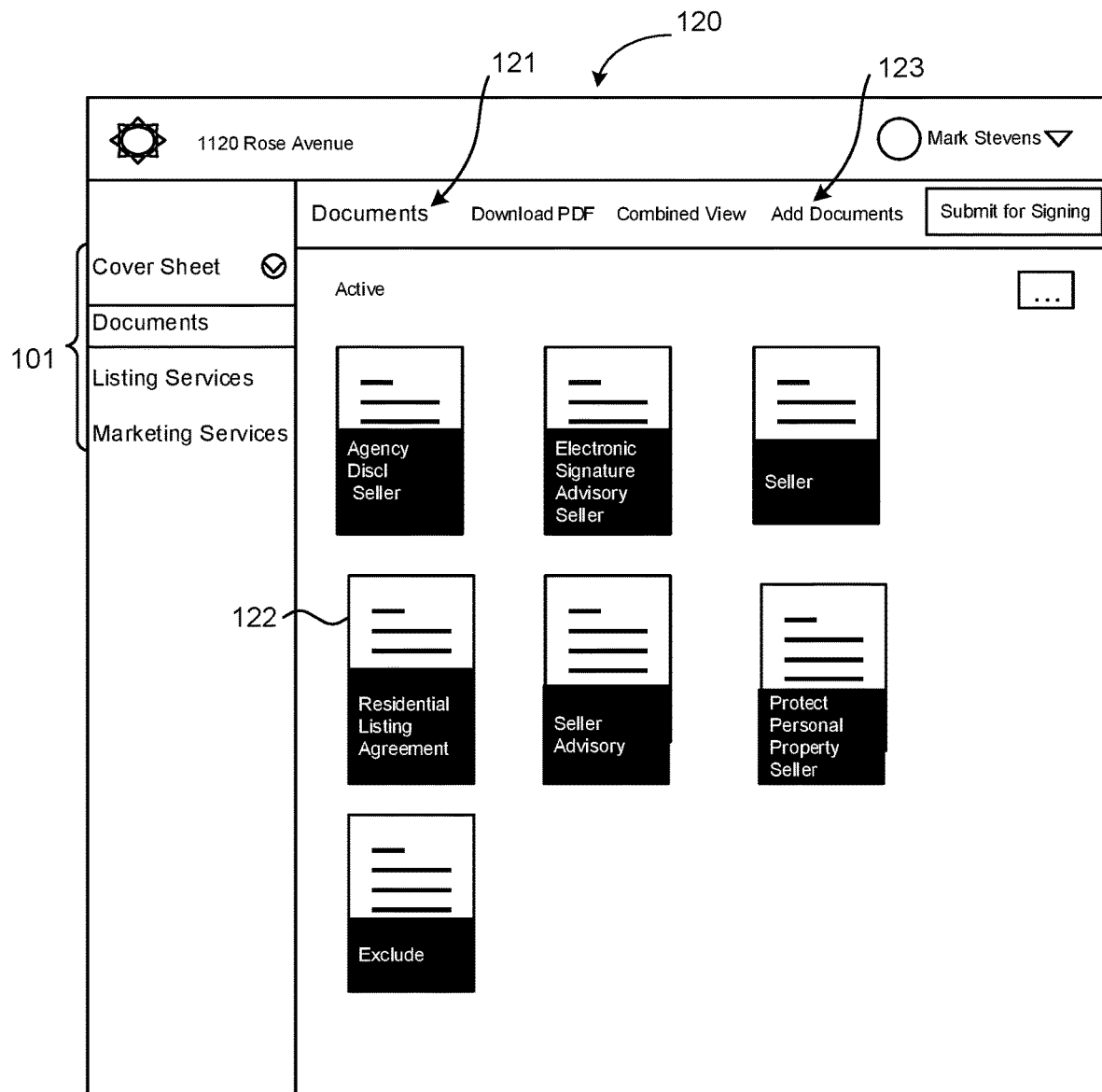
FIG. 12 is a diagram showing, by way of example, an interactive form displaying a document package.

Based on the document template selections in the document page 111, a package of documents is generated for the transaction and displayed to the user. FIG. 12 is a diagram showing, by way of example, an interactive form 120 displaying document templates for possible inclusion in a document package 121. The web page 120 provides a listing of documents 122 for a listing agreement, for example, that can be included in the document package 121 for the property transaction upon confirmation of the transaction. In one embodiment, the documents templates can be displayed as thumbnail images, and selected for review and revision. Each thumbnail representation of the active documents can include a title of the document and a menu, which allows the user to edit or obtain additional information about that document. Each of the documents in the package can be auto-populated with the data values entered in the cover sheet prior to display or upon display. Further, users can upload external documents via an add document button 123 on the interactive form 120. For example, homeowner association guidelines and papers may not be easily available to individuals that do not belong to the homeowner association and thus, can be uploaded.

During auto-population, the population logic processes the documents selected for the package by reviewing the form elements, looking up data field identifiers for the data fields in the data model, and populating the form elements with the data values in the data model that correspond with the data field identifiers. The user can select a thumbnail for each document and review the documents with the populated data values. If any form element remains unpopulated, the user can enter a data value, which is saved with a data field identifier associated with the unpopulated form element and stored in the data model. Other documents in the package that include a form element associated with the data field identifier can be populated with the corresponding data value.

In different embodiments, different methods for looking up the data field values to populate the documents are possible, depending on whether the data field values are stored in a reference database, in a reference document, or in a combination of both. In one example, the data field values for a document package are stored in both a database and a reference document as a value for a corresponding form element. The reference document data field or source includes the data value of record and the database functions as a cache for that value. The cache is used to simplify accelerated data field access for populating other documents. In a different example, the data values can be stored in the data fields of a reference document in the package and any changes to the data values can be made immediately to the respective form elements in the other documents. In a further example, the data values are stored in a database and accessed upon display of the documents in the package. For instance, when a change is made to a data value, the value is changed in the database and the next time the documents in the package are displayed, the fields are populated with the updated values stored in the database just prior to display.

At the same time or after auto-population of the documents, compliance logic can be performed to ensure the completeness, correctness, consistency, and compliance of the documents. Completeness logic helps ensure that all required documents are included in the document package for the transaction and that all required fields for each document are filled in. Rules regarding each form element are associated with the field definitions and based on the information provided by the field definition, a determination can be made that the associated form element remains blank. For example, a signature field must be signed prior to finalizing the document package for providing to the other party. If no signature has been entered, completeness logic can identify the field and send a notification to at least one user, such as the real estate agent or client.

In one embodiment, completeness logic can be used to create status indicators that indicate unfinished elements, such as empty form elements within one or more documents. For example, the status indicators can indicate that some fields in a required document have not yet been filled in. The indicators can appear as a pop-up message or other type of notification while the user is working on the document in which a completeness error is identified, when the user leaves the document with the completeness error, or during checking of the document package. Ensuring that a document package is complete by including all necessary documents for a transaction and that all form elements within the documents of the package are filled in helps limit interactions with parties to or stakeholders of a transaction before information in the document package is complete. For instance, the system can prevent a document package from being sent to another party to the transaction for signatures before required information is filled in, which can prevent multiple rounds of back and forth communication between the parties to fix the error and result in completing the transaction in less time.

Figure 13A:
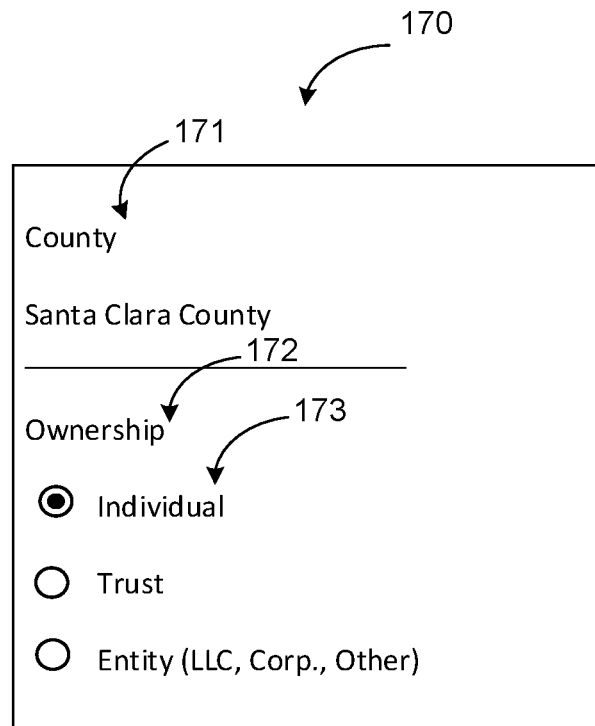
FIG. 13A is a diagram of an interactive form showing, by way of example, a portion of the cover sheet of FIG. 8.

Completeness logic can also be used to identify form elements to be added to a document depending on data values that are filled in for other form elements in documents included in the package. FIG. 13A is a diagram of an interactive form showing, by way of example, a portion of the cover sheet 170 of FIG. 8. The cover sheet 170 can include form elements for identifying a county 171 in which a property is located and the type of ownership 172 of the property, including individual, trust, and entity. In this example, the property is owned by an individual and the individual's name, which can be provided under the seller's name form element as described above with reference to FIG. 8, can be used to populate form elements associated with identifiers for the owner's name or identity.

Figure 13B:
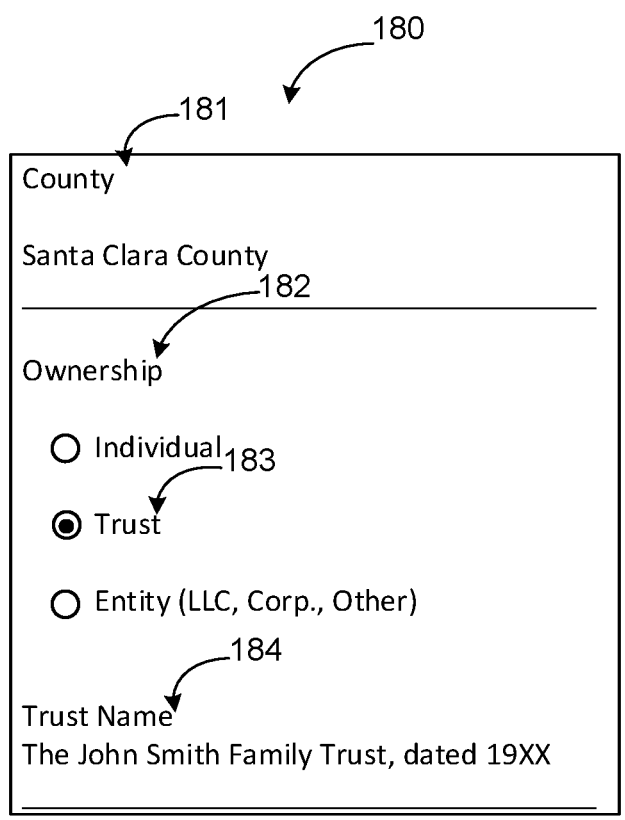
FIG. 13B is a diagram of an interactive form showing, by way of example, the portion of the cover sheet of FIG. 13A with a different data value.

However, additional information may be required based on a data value entered by a user. For example, if information is added indicating that a property has a swimming pool, additional forms may be required. The completeness logic can be performed to request the additional information. FIG. 13B is a diagram of an interactive form showing, by way of example, the portion of the cover sheet 180 of FIG. 13A with a different data value. The cover sheet 180 can include form elements for identifying a county 181 in which a property is located and the type of ownership 182 of the property, including individual, trust, and entity. In this example, a trust 183 owns the property, which is the subject of the transaction. However, additional information about the trust is necessary to complete the documents in the package because the previous form elements did not include a request for trust name. The completeness logic identifies the trust selection 183 and displays an additional field 184 for a name of the trust.

Prior to, during, or after application of the completeness logic, consistency logic can be performed to ensure that related form elements in the documents in a document package are filled in in a semantically-consistent manner. FIG. 14 is a diagram of a document template 190 with form elements 191, 192 for property price. The document 190 includes form elements for two different representations 191, 192 of the sales price for a property. In one field 191, the price data value 191 should be spelled out in words, as is common practice for paper bank checks. The other form element 192 requires the price to be entered with a currency indicator, such as a dollar sign followed by a number. The consistency logic for checking syntax can refer to the data field indicator "Prop.Sales.Price.Num," which is associated with the form element 192 for sales price number and the data field identifier "Prop.Sales.Price.Str" for the sales price string of words. Based on the similarity of the identifiers, including the common portion "Prop.Sales.Price," the data value of the spelled-out field could be checked for consistency against the numeric sales price via the consistency logic.

In a further embodiment, the consistency logic together with a data entry system could derive a string representation of the sales price consistently and automatically after the numeric representation of the price is entered. The consistency logic can also identify and input the numeric representation of the sales price after a string representation of the sales price. Other form elements that can benefit from a consistency check include ensuring that the property address in numbers matches with a spelled-out version of the property number.

In addition to performing consistency logic on the document package, correctness logic can also be performed to ensure that data values populating the form element are verified by authoritative sources. Specifically, the correctness logic can identify invalid data values and provide suggestions for data values via an authoritative source, as described above with respect to FIGS. 8, 13A, and 13B. For instance, the correctness logic can identify invalid email addresses, such as those without the ampersand symbol or a domain. Additionally, the correctness logic can connect to a multiple listing service or regional database that stores addresses and utilize those addresses to provide suggestions for partial data values entered by a user for an address. Other examples of form elements on which the correctness logic can be applied include zip code and state, and street address and city, as well as many other form elements. The correctness that a particular zip code is located within a particular state can be verified by a mapping database or property records database.

Also, the data values can be checked using compliance logic, which helps ensure that the documents in the package comply with all regulatory requirements. The compliance logic can access and use one or more authoritative sources to look up a required set of documents based on the address of the property being sold. In one example, the regulatory information is entered into the compliance system by real estate subject matter experts using a Transaction Coordinator Platform. The human experts consult appropriate governmental and other sources, create document templates, and assign the templates to the proper geographic region. The document templates can be generated from documents prepared by different organizations, such as regional real estate associations and groups. Additionally, online government sources can be used to obtain information.

Finally, confirmation logic can be applied to the document package prior to sending the completed document package to the other party. The confirmation logic ensures that all of the required signing and dating of the documents are completed. A notification can be provided to the user to identify any blank fields that should have a signature or date. The notification can be provided by a pop-up notification or by highlighting the blank field. Once the document package has been populated and checked, and no errors exist, the package can be provided to the other party.

Once the document package for a real estate transaction is generated, documentation of the transaction is important to properly record in order to protect the rights of people to own and use particular parcels of land and land-related resources. Although buyers and sellers may have their own copies of records, their copies can be lost, discarded, damaged or destroyed over time. Property owners rely on other institutions to maintain backup or master copies of various documents.

Such obstacles of recording publicly accessible transaction documents and confidential records regarding the transaction can be overcome by bringing together all the important records of a real estate transaction and recording the records in an accountability blockchain ledger with a timestamp so that all of the documents for a transaction are available at once in a single block on a blockchain under a compliance and accountability blockchain approach. Recording publicly accessible documents is described in detail in commonly-owned U.S. Patent Application, titled "Blockchain-Based System and Method for Document Transformation and Accountability," filed Sep. 4, 2019, and U.S. Patent Application, titled "Multi-Tier Blockchain-Based System and Method for Document Transformation and Accountability," filed Sep. 4, 2019, the disclosures of which are herein incorporated by reference. Multi-tier or single tier blockchains can be used, as described in detail with respect to commonly-owned U.S. Patent Application, titled "Single-Tier Blockchain-Based System and Method for Document Transformation and Accountability," filed Sep. 4, 2019, and in commonly-owned U.S. Patent Application, titled "Single-Tier Blockchain-Based System and Method for Document Transformation and Accountability via Different Node Types," filed Sep. 4, 2019, the disclosures of which are hereby incorporated by reference.

While the invention has been particularly shown and described as referenced to the embodiments thereof, those skilled in the art will understand that the foregoing and other changes in form and detail may be made therein without departing from the spirit and scope of the invention.

What is claimed is:

1. A method for document transformation and compliance, comprising:
   maintaining document templates relating to real estate, each template comprising a plurality of data fields each associated with a data field identifier, wherein the data field identifiers are same for the data fields that are the same in different documents;
   receiving data values in one or more of the data fields of at least one document template of a plurality of document templates;
   receiving an address for a property;
   identifying based on the received property address a set of compliance rules to be applied to populated data fields for determining correctness;
   receiving a role of a user associated with the property;
   based on the property address and user role, selecting a subset of the document templates to be populated from the plurality of document templates as active documents for a transaction of the property;
   generating a model for the active documents comprising the received data values and the data field identifiers for the data fields populated by the received data values, wherein each received data value is associated with the data field identifier for the data field populated with that received data value;
   populating via the model those data fields in the active documents that are unpopulated with the received data values associated with the data field identifiers for those unpopulated data fields; and
   monitoring correctness of the populated data values in the active documents using the compliance rules via automatic verification of at least a portion of the data values by an authoritative source of subject matter for the portion of the data values.

2. A method according to claim 1, further comprising:
   running completeness logic on the active documents and the data fields of the active documents, comprising at least one of:
      comparing the active documents for the transaction with a library of document templates for the transaction and determining one of a new active document template is required for the transaction and no further active documents are required for the transaction;
      identifying one or more data fields without associated data values and creating a status indicator for the one or more identified data fields; and
      adding one or more data fields to one of the active documents based on a related data field with an associated data value in that active document.

3. A method according to claim 1, further comprising: running consistency logic on the data fields of the active documents, comprising: identifying a change to one of the data values within one of the data fields of one such active document; and updating the data values with the changed data value to each active document with at least one data field with the same data field identifier as the changed data value.

4. A method according to claim 1, further comprising: running correctness logic on one or more of the data fields of the active documents, comprising: reviewing the data field values and combinations of the data field values within the active documents; and determining whether the data field values and the combinations of data field values are verified by the authoritative source.

5. A method according to claim 4, further comprising:
   during running of the correctness logic, connecting to one or more servers with information for the authoritative source; and
   checking the data fields in the active documents for accuracy with the information of the authoritative source.

6. A method according to claim 1, further comprising:
   running compliance logic on the active documents, comprising:
      confirming that the active documents include all documents in a required set of documents for the transaction.

7. A method according to claim 1, further comprising:
   running confirmation logic on the data fields of the active documents, comprising:
      reviewing the active documents;
      identifying fields designated for signatures and dates; and
      determining whether the identified fields designated for signatures and dates are associated with associated data values.

8. A method according to claim 1, further comprising:
   when one or more of the active documents fails to comply with at least one of the compliance rules, generating a recommendation for changes to that document to comply with the compliance rules; and
   providing the recommendation to one or more users.

9. A method according to claim 1, further comprising:
   maintaining a transaction coordinator platform comprising definitions of the document templates, data fields within the document templates, and groupings of the document templates as the active documents for property transactions.

10. A method according to claim 1, further comprising:
    storing the document templates in a library, wherein each document template is associated with one or more of a geographic region, a buyer, a seller, and a homeowner's association.

11. A method according to claim 1, further comprising:
    storing the associated data values in a persistent storage that is a reference source for the associated data values for all the active documents.

12. A method according to claim 1, further comprising at least one of: storing in persistent storage each of the data field identifiers with one or more of a data type and a meaning of the data value as a field definition, wherein the persistent storage is a source for accessing the field definitions; and distributing the field value definitions across the document templates and designating one of the document templates as a reference for the source of each field definition.

13. A system for document transformation and compliance, comprising:
    a database to store a plurality of document templates relating to real estate, each template comprising a plurality of data fields each associated with a data field identifier, wherein the data field identifiers are same for the data fields that are the same in different documents;

a server comprising a central processing unit, memory, an input port to receive the document templates and an output port to output a package of at least a portion of the document templates, wherein the central processing unit is configured to:
  receive data values in one or more of the data fields of at least one document template;
  receive an address for a property;
  identify based on the received property address a set of compliance rules to be applied to populated data fields for determining correctness;
  receive a role of a user associated with the property;
  based on the property address and user role, select a subset of the document templates to be populated from the plurality of document templates as active documents for a transaction of the property;
  generate a model for the active documents comprising the received data values and the data field identifiers for the data fields populated by the received data values, wherein each received data value is associated with one of the data field identifiers for the data field populated with that received data value;
  populate via the model those data fields in the active documents that are unpopulated with the received data values associated with the data field identifiers for those unpopulated data fields; and
  monitor correctness of the populated data values in the active documents using the compliance rules via automatic verification of at least a portion of the data values by an authoritative source of subject matter for the portion of the data values.

14. A system according to claim 13, wherein the central processing unit runs completeness logic on the active documents and the data fields of the active documents, wherein the completeness logic comprises at least one of:
  comparing the active documents for the transaction with a library of document templates for the transaction and determining one of a new active document template is required for the transaction and no further active documents are required for the transaction;
  identifying one or more data fields without associated data values and creating a status indicator for the one or more identified data fields; and
  adding one or more data fields to one of the active documents based on a related data field with an associated data value in that active document.

15. A system according to claim 13, wherein the central processing unit runs consistency logic on the data fields of the active documents comprising identifying a change to one of the data values within one of the data fields of one such active document and updating the data values with the changed data value in each active document with at least one data field with the same data field identifier as the changed data value.

16. A system according to claim 13, wherein the central processing unit runs correctness logic on one or more of the data fields of the active documents comprising reviewing the data field values and combinations of the data field values within the active documents and determining whether the data field values and the combinations of data field values are verified by the authoritative source.

17. A system according to claim 16, wherein the central processing unit during running of the correctness logic, connects to one or more servers with information for the authoritative source and checks the data fields in the active documents for accuracy with the information of the authoritative source.

18. A system according to claim 13, wherein the central processing unit runs compliance logic on the active documents comprising confirming that the active documents include all documents in a required set of documents for the transaction.

19. A system according to claim 13, wherein the central processing unit runs confirmation logic on the data fields of the active documents comprising reviewing the active documents, identifying fields designated for signatures and dates, and determining whether the identified fields designated for signatures and dates are associated with associated data values.

20. A system according to claim 13, wherein the central processing unit generates a recommendation for changes to one or more of the active documents to comply with the compliance rules when those documents fail to comply with at least one of the compliance rules and provides the recommendation to one or more users.

21. A system according to claim 13, wherein the central processing unit maintains a transaction coordinator platform comprising definitions of the document templates, data fields within the document templates, and groupings of the document templates as the active documents for property transactions.

22. A system according to claim 13, wherein the document templates are stored as a library and each document template is associated with one or more of a geographic region, buyers' documents in a property transaction, sellers' documents in a property transaction, and a homeowner's association.

23. A system according to claim 13, further comprising:
  a persistent storage for storing the associated data values and acts as a reference source for the associated data values for all the active documents.

24. A system according to claim 13, wherein the data field identifiers are stored as one or more of: in persistent storage with one or more of a data type and a meaning of the data value as a field definition, wherein the persistent storage is a source for accessing the field definitions; and distributed across the document templates, one of the document templates designated as a reference for the source of each field definition.

* * * * *